(12) United States Patent
Halliday et al.

(10) Patent No.: US 12,308,674 B1
(45) Date of Patent: May 20, 2025

(54) ACTIVE ENERGY BALANCING FOR ENERGY STORAGE SYSTEMS

(71) Applicant: Moment Energy Inc., Port Coquitlam (CA)

(72) Inventors: Grayson Reid Halliday, Burnaby (CA); Gabriel Giles Soares, Coquitlam (CA)

(73) Assignee: Moment Energy Inc. (CA)

( * ) Notice: Subject to any disclaimer, the term of this patent is extended or adjusted under 35 U.S.C. 154(b) by 0 days.

(21) Appl. No.: 18/417,667

(22) Filed: Jan. 19, 2024

(51) Int. Cl.
*H02J 7/00* (2006.01)

(52) U.S. Cl.
CPC .......... *H02J 7/0019* (2013.01); *H02J 7/0018* (2013.01); *H02J 7/0048* (2020.01); *H02J 7/00712* (2020.01); *H02J 2207/50* (2020.01); *Y10S 320/23* (2013.01); *Y10S 320/24* (2013.01)

(58) Field of Classification Search
CPC ...... H02J 7/0019; H02J 7/0018; H02J 7/0048; H02J 7/00712
USPC ....................................................... 320/109
See application file for complete search history.

(56) References Cited

U.S. PATENT DOCUMENTS

| | | | | |
|---|---|---|---|---|
| 5,479,083 A * | 12/1995 | Brainard | ........... | H01M 10/0413 320/124 |
| 5,631,534 A * | 5/1997 | Lewis | ................ | H01M 10/482 320/118 |
| 5,982,142 A * | 11/1999 | Sullivan | ................ | H02J 7/0018 320/118 |
| 6,140,800 A * | 10/2000 | Peterson | ............... | H02J 7/0018 320/128 |
| 6,150,795 A * | 11/2000 | Kutkut | .................. | H02J 7/0018 320/118 |
| 7,479,346 B1 * | 1/2009 | Chow | ............... | H01M 10/6567 320/112 |
| 7,602,145 B2 * | 10/2009 | Renda | ..................... | B60L 58/15 320/118 |
| 7,611,799 B2 * | 11/2009 | Marraffa | ............. | H01M 50/296 429/96 |
| 7,612,530 B2 * | 11/2009 | Konishi | ................ | H02J 7/0016 320/120 |

(Continued)

OTHER PUBLICATIONS

Guo et al., "An Active Equalization Method Based on an Inductor and a Capacitor for Series Battery Pack", IEEE Transactions on Power Electronics, vol. 38, No. 3, Mar. 2023.

(Continued)

*Primary Examiner* — John T Trischler
(74) *Attorney, Agent, or Firm* — Foley & Lardner LLP

(57) ABSTRACT

Systems, methods and circuits described herein provide energy transfer to balance batteries of an energy storage system. A system can include a circuit coupled with a first battery cell and a second battery cell. The circuit can include a charge unit to store energy transferred between the first and the second battery cells, a first node of the charge unit coupled with the first and the second battery cells and a second node of the charge unit coupled with a first transistor and a second transistor. At least one of the first transistor and the second transistor can control a first transfer of the energy from a first one of the first battery cell and the second battery cell to the charge unit and control a second transfer of the energy from the charge unit to a remaining one of the first battery cell and the second battery cell.

20 Claims, 11 Drawing Sheets

(56) References Cited

U.S. PATENT DOCUMENTS

| | | | | |
|---|---|---|---|---|
| 7,723,955 B2* | 5/2010 | Zaag | B60L 58/14 | |
| | | | 320/152 | |
| 7,740,142 B2* | 6/2010 | Miller | H01M 50/296 | |
| | | | 211/26 | |
| 8,100,271 B2* | 1/2012 | Conrardy | H01M 50/224 | |
| | | | 211/49.1 | |
| 8,134,338 B2* | 3/2012 | Choi | B60L 58/20 | |
| | | | 320/155 | |
| 8,253,378 B2* | 8/2012 | Lee | H02J 7/0047 | |
| | | | 320/118 | |
| 8,405,349 B2* | 3/2013 | Kikinis | H02J 7/0016 | |
| | | | 320/117 | |
| 8,441,234 B2* | 5/2013 | Cheng | H01M 10/42 | |
| | | | 320/134 | |
| 8,686,693 B2* | 4/2014 | Bhowmik | H02J 7/0014 | |
| | | | 320/152 | |
| 8,692,515 B2* | 4/2014 | Nakao | H02J 7/0016 | |
| | | | 320/118 | |
| 8,721,010 B2* | 5/2014 | Conrardy | G06Q 30/00 | |
| | | | 312/257.1 | |
| 8,786,255 B2* | 7/2014 | Gollob | H01M 10/46 | |
| | | | 320/118 | |
| 8,963,499 B2* | 2/2015 | Choi | H02J 7/0016 | |
| | | | 320/122 | |
| 9,059,588 B2* | 6/2015 | Nakao | H02J 7/0014 | |
| 9,077,181 B2* | 7/2015 | Schlaupitz | H02J 7/00 | |
| 9,083,188 B2* | 7/2015 | Nakao | H02J 7/0018 | |
| 9,112,205 B2* | 8/2015 | Conrardy | H01M 50/204 | |
| 9,130,377 B2* | 9/2015 | Barsukov | H02J 7/0048 | |
| 9,136,714 B2* | 9/2015 | Tsai | H02J 7/0014 | |
| 9,142,979 B2* | 9/2015 | Tsai | H02J 7/0042 | |
| 9,148,029 B2* | 9/2015 | Tsai | H02J 7/0042 | |
| 9,160,330 B2* | 10/2015 | Wu | H02J 7/00 | |
| 9,166,416 B2* | 10/2015 | Gerlovin | H02J 7/0019 | |
| 9,172,255 B2* | 10/2015 | Tsai | H02J 7/0014 | |
| 9,172,256 B2* | 10/2015 | Tsai | H02J 7/0016 | |
| 9,172,259 B2* | 10/2015 | Hwang | H02J 3/32 | |
| 9,178,367 B2* | 11/2015 | Nakao | H02J 7/0014 | |
| 9,203,121 B2* | 12/2015 | Liu | H02J 7/0016 | |
| 9,203,246 B2* | 12/2015 | Kang | H02J 7/0016 | |
| 9,236,749 B2* | 1/2016 | Gibbs | B60L 58/22 | |
| 9,270,132 B2* | 2/2016 | Yun | H02J 7/0016 | |
| 9,277,298 B2* | 3/2016 | Yang | H04Q 9/00 | |
| 9,300,016 B2* | 3/2016 | Yun | H02J 7/34 | |
| 9,301,408 B2* | 3/2016 | Conrardy | H05K 5/00 | |
| 9,312,525 B2* | 4/2016 | Conrardy | H01M 50/204 | |
| 9,331,497 B2* | 5/2016 | Beaston | H02J 7/00 | |
| 9,401,606 B2* | 7/2016 | Murray | H02J 7/0016 | |
| 9,455,580 B2* | 9/2016 | Mao | H02J 7/0016 | |
| 9,488,977 B2* | 11/2016 | Cho | H01M 10/4207 | |
| 9,583,957 B2* | 2/2017 | Hong | H02J 7/0019 | |
| 9,641,013 B2* | 5/2017 | Lee | H02J 7/0014 | |
| 9,705,340 B2* | 7/2017 | Lucea | B60L 58/22 | |
| 9,705,342 B2* | 7/2017 | Zhao | H02J 7/0016 | |
| 9,755,200 B2* | 9/2017 | Conrardy | H01M 50/298 | |
| 9,793,725 B2* | 10/2017 | Sung | H02J 7/0019 | |
| 9,847,654 B2* | 12/2017 | Beaston | H02J 7/342 | |
| 9,853,461 B2* | 12/2017 | Kubota | H02J 7/0016 | |
| 9,966,739 B2* | 5/2018 | Chen | H02B 1/34 | |
| 9,979,211 B2* | 5/2018 | Barsukov | H02J 7/0016 | |
| 10,008,863 B2* | 6/2018 | Hamada | B60L 58/22 | |
| 10,110,021 B2* | 10/2018 | Hamada | H01M 10/46 | |
| 10,148,098 B2* | 12/2018 | Liu | H02J 7/0016 | |
| 10,153,624 B2* | 12/2018 | Park | H01M 50/244 | |
| 10,177,580 B2* | 1/2019 | Wu | H02J 7/0016 | |
| 10,181,733 B2* | 1/2019 | Jo | B60L 58/22 | |
| 10,193,112 B2* | 1/2019 | Zimbru, Jr. | H01M 50/271 | |
| 10,211,648 B2* | 2/2019 | Hasenkopf | H02J 7/0024 | |
| 10,236,694 B2* | 3/2019 | Greening | H02J 7/0019 | |
| 10,283,974 B2* | 5/2019 | Macris | G01R 31/3842 | |
| 10,312,484 B2* | 6/2019 | Conrardy | H01M 50/204 | |
| 10,312,553 B2* | 6/2019 | Kubota | H01M 10/052 | |
| 10,348,100 B2* | 7/2019 | Cao | H02J 7/0019 | |
| 10,439,372 B2* | 10/2019 | Chen | B65D 90/0053 | |
| 10,446,880 B2* | 10/2019 | Sung | H01M 50/512 | |
| 10,559,963 B2* | 2/2020 | Nakao | H01M 10/44 | |
| 10,581,121 B2* | 3/2020 | Nakao | H02J 7/0019 | |
| 10,778,014 B2* | 9/2020 | Barsukov | H02J 7/0016 | |
| 10,848,098 B2* | 11/2020 | Agarwal | H01M 10/441 | |
| 10,894,498 B2* | 1/2021 | Lee | B60P 1/64 | |
| 11,027,614 B2* | 6/2021 | Nakao | B60L 58/21 | |
| 11,034,259 B2* | 6/2021 | Ionescu | B60L 58/22 | |
| 11,139,661 B2* | 10/2021 | Stuart | H02J 7/0029 | |
| 11,190,028 B2* | 11/2021 | Karlsson | B60L 58/22 | |
| 11,239,670 B2* | 2/2022 | Gray | H01M 10/4264 | |
| 11,383,617 B2* | 7/2022 | Woeste | H02J 7/0014 | |
| 11,437,828 B2* | 9/2022 | Kuranuki | H02J 7/0019 | |
| 11,522,245 B2* | 12/2022 | Lee | H01M 50/204 | |
| 11,699,909 B1* | 7/2023 | Kahn | H02J 7/0013 | |
| | | | 320/126 | |
| 11,820,253 B2* | 11/2023 | Ionescu | B60L 58/22 | |
| 11,831,192 B2* | 11/2023 | Kahn | H02J 7/0025 | |
| 2005/0084748 A1* | 4/2005 | Miller | H01M 10/6557 | |
| | | | 211/13.1 | |
| 2005/0242774 A1* | 11/2005 | Marraffa | H01M 10/6561 | |
| | | | 361/730 | |
| 2007/0178369 A1* | 8/2007 | Conrardy | H01M 50/224 | |
| | | | 206/703 | |
| 2007/0278915 A1* | 12/2007 | Conrardy | H01M 50/262 | |
| | | | 29/729 | |
| 2008/0018299 A1* | 1/2008 | Renda | B60L 58/19 | |
| | | | 320/116 | |
| 2008/0018300 A1* | 1/2008 | Zaag | B60L 3/04 | |
| | | | 320/118 | |
| 2008/0116850 A1* | 5/2008 | Konishi | H02J 7/0016 | |
| | | | 320/118 | |
| 2008/0211459 A1* | 9/2008 | Choi | B60L 58/16 | |
| | | | 320/134 | |
| 2009/0058386 A1* | 3/2009 | Tarng | H03L 7/081 | |
| | | | 323/282 | |
| 2009/0278496 A1* | 11/2009 | Nakao | H02J 7/0018 | |
| | | | 320/118 | |
| 2010/0231166 A1* | 9/2010 | Lee | H02J 7/0019 | |
| | | | 320/118 | |
| 2010/0305770 A1* | 12/2010 | Bhowmik | B60L 58/21 | |
| | | | 324/426 | |
| 2010/0327807 A1* | 12/2010 | Kikinis | H02J 7/0016 | |
| | | | 320/116 | |
| 2011/0267005 A1* | 11/2011 | Gollob | H02J 7/0014 | |
| | | | 320/116 | |
| 2012/0038321 A1* | 2/2012 | Cheng | H01M 10/42 | |
| | | | 320/118 | |
| 2012/0086399 A1* | 4/2012 | Choi | H02J 7/0029 | |
| | | | 320/116 | |
| 2012/0117785 A1* | 5/2012 | Conrardy | H01M 50/224 | |
| | | | 29/428 | |
| 2012/0119746 A1* | 5/2012 | Macris | H02J 7/0013 | |
| | | | 324/431 | |
| 2012/0212182 A1* | 8/2012 | Li | H02J 7/0019 | |
| | | | 320/116 | |
| 2012/0286733 A1* | 11/2012 | Chang | H02J 7/0018 | |
| | | | 320/118 | |
| 2013/0008862 A1* | 1/2013 | Conrardy | H01M 50/224 | |
| | | | 211/49.1 | |
| 2013/0021000 A1* | 1/2013 | Kuraishi | H02J 7/0016 | |
| | | | 320/118 | |
| 2013/0057198 A1* | 3/2013 | Gerlovin | H02J 7/0019 | |
| | | | 320/118 | |
| 2013/0069429 A1* | 3/2013 | Yang | H04Q 9/00 | |
| | | | 307/23 | |
| 2013/0093248 A1* | 4/2013 | Liu | H01M 10/441 | |
| | | | 307/77 | |
| 2013/0099579 A1 | 4/2013 | Murray | | |
| 2013/0253715 A1* | 9/2013 | Cho | B60L 58/10 | |
| | | | 700/286 | |
| 2013/0328530 A1* | 12/2013 | Beaston | H02J 7/0019 | |
| | | | 320/128 | |
| 2013/0342156 A1* | 12/2013 | Nakao | B60L 58/22 | |
| | | | 320/104 | |

(56) References Cited

U.S. PATENT DOCUMENTS

| | | | | |
|---|---|---|---|---|
| 2014/0015472 A1* | 1/2014 | Tsai | H02J 7/0016 | 320/103 |
| 2014/0015473 A1* | 1/2014 | Tsai | G06F 30/20 | 320/103 |
| 2014/0015474 A1* | 1/2014 | Tsai | G06F 30/20 | 320/103 |
| 2014/0015475 A1* | 1/2014 | Nakao | H01M 10/425 | 320/103 |
| 2014/0015477 A1* | 1/2014 | Tsai | H02J 7/0014 | 320/126 |
| 2014/0015490 A1* | 1/2014 | Tsai | G06F 30/20 | 320/134 |
| 2014/0019111 A1* | 1/2014 | Tsai | H02J 7/0016 | 703/18 |
| 2014/0070757 A1* | 3/2014 | Hong | H02J 7/0018 | 320/103 |
| 2014/0077752 A1* | 3/2014 | Barsukov | H02J 7/0048 | 320/103 |
| 2014/0079960 A1* | 3/2014 | Yun | H02J 7/34 | 429/7 |
| 2014/0084868 A1* | 3/2014 | Yun | H02J 7/0016 | 320/118 |
| 2014/0145678 A1* | 5/2014 | Hwang | H02J 3/32 | 320/118 |
| 2014/0197776 A1* | 7/2014 | Schlaupitz | B60L 50/61 | 320/103 |
| 2014/0229398 A1* | 8/2014 | Conrardy | G06Q 30/00 | 705/330 |
| 2014/0300323 A1* | 10/2014 | Gibbs | B60L 58/13 | 320/116 |
| 2014/0327399 A1* | 11/2014 | Wu | H02J 7/00 | 327/109 |
| 2014/0327407 A1* | 11/2014 | Lucea | H02J 7/00 | 320/134 |
| 2014/0340022 A1* | 11/2014 | Kang | H02J 7/0014 | 320/103 |
| 2014/0340049 A1* | 11/2014 | Zhao | H02J 7/00714 | 320/145 |
| 2015/0002083 A1* | 1/2015 | Nakao | H02J 7/0016 | 320/107 |
| 2015/0002084 A1* | 1/2015 | Nakao | H02J 7/00308 | 320/107 |
| 2015/0035490 A1* | 2/2015 | Mao | H02J 7/0019 | 320/120 |
| 2015/0162580 A1* | 6/2015 | Conrardy | H01M 50/204 | 29/428 |
| 2015/0326041 A1* | 11/2015 | Hamada | H02J 7/0019 | 320/103 |
| 2015/0340886 A1* | 11/2015 | Sung | H02J 7/0016 | 320/118 |
| 2016/0028256 A1* | 1/2016 | Kubota | H02J 7/0014 | 320/118 |
| 2016/0072316 A1* | 3/2016 | Barsukov | H02J 7/0016 | 320/112 |
| 2016/0141894 A1* | 5/2016 | Beaston | H02J 7/0014 | 320/103 |
| 2016/0141895 A1* | 5/2016 | Liu | H01M 10/441 | 320/103 |
| 2016/0172875 A1* | 6/2016 | Lee | H02J 7/0014 | 320/118 |
| 2016/0190528 A1* | 6/2016 | Conrardy | H05K 7/183 | 312/351 |
| 2016/0276849 A1* | 9/2016 | Hamada | H02J 7/0019 | |
| 2017/0084959 A1* | 3/2017 | Nakao | H02J 7/0048 | |
| 2017/0110893 A1* | 4/2017 | Cao | H02J 7/0016 | |
| 2017/0244225 A1* | 8/2017 | Chen | A47B 53/00 | |
| 2017/0257022 A1* | 9/2017 | Bryant | H02M 1/088 | |
| 2017/0288378 A1* | 10/2017 | Park | H02B 1/012 | |
| 2017/0294633 A1* | 10/2017 | Zimbru, Jr. | H01M 50/503 | |
| 2017/0310127 A1* | 10/2017 | Wu | H02J 7/0016 | |
| 2017/0338672 A1* | 11/2017 | Hasenkopf | H02J 7/0016 | |
| 2017/0373511 A1* | 12/2017 | Jo | H01M 10/446 | |
| 2018/0019606 A1* | 1/2018 | Kang | H02J 7/0019 | |
| 2018/0034288 A1* | 2/2018 | Greening | H02J 7/0029 | |
| 2018/0040922 A1* | 2/2018 | Sung | H01M 10/42 | |
| 2018/0166911 A1* | 6/2018 | Ionescu | B60L 58/16 | |
| 2018/0167028 A1* | 6/2018 | Agarwal | H02S 40/38 | |
| 2018/0226774 A1* | 8/2018 | Chen | H02B 1/34 | |
| 2018/0226810 A1* | 8/2018 | Barsukov | H02J 7/0048 | |
| 2018/0233787 A1* | 8/2018 | Kubota | H01M 10/44 | |
| 2018/0339636 A1* | 11/2018 | Lee | B60P 1/6418 | |
| 2019/0039476 A1* | 2/2019 | Nakao | G01R 31/396 | |
| 2019/0044327 A1* | 2/2019 | Richardson | H01M 10/441 | |
| 2019/0044347 A1* | 2/2019 | Richardson | H02J 7/00712 | |
| 2019/0097280 A1* | 3/2019 | You | H01M 10/627 | |
| 2020/0059106 A1* | 2/2020 | Karlsson | H01M 10/425 | |
| 2020/0112179 A1* | 4/2020 | Gray | B60L 58/22 | |
| 2020/0161612 A1* | 5/2020 | Lee | H01M 50/262 | |
| 2020/0164767 A1* | 5/2020 | Woeste | H01M 10/482 | |
| 2020/0185931 A1* | 6/2020 | Stuart | H02J 7/0019 | |
| 2021/0221251 A1* | 7/2021 | Ionescu | G01R 31/382 | |
| 2021/0305816 A1* | 9/2021 | Kuranuki | G01R 19/16538 | |
| 2021/0305818 A1* | 9/2021 | Kilshaw | H02J 7/0018 | |
| 2021/0394609 A1* | 12/2021 | Furukawa | B60K 6/445 | |
| 2022/0224124 A1* | 7/2022 | Liang | H02J 7/0016 | |
| 2022/0285779 A1* | 9/2022 | Kim | H01M 50/262 | |
| 2022/0294051 A1* | 9/2022 | Kim | H01M 50/204 | |
| 2022/0311255 A1* | 9/2022 | Lim | H02J 7/0048 | |
| 2023/0011716 A1* | 1/2023 | Kahn | G01R 31/385 | |
| 2023/0040296 A1* | 2/2023 | Jeong | H01M 50/691 | |
| 2023/0050428 A1* | 2/2023 | Lee | H02J 50/80 | |
| 2023/0053745 A1* | 2/2023 | Lesso | H02J 7/0013 | |
| 2023/0059155 A1* | 2/2023 | Lesso | H02J 7/345 | |
| 2023/0059646 A1* | 2/2023 | Lesso | H02J 7/345 | |
| 2023/0148088 A1* | 5/2023 | Lee | G01R 31/396 | 702/63 |
| 2023/0253803 A1* | 8/2023 | Kahn | H02J 7/0063 | 320/126 |
| 2024/0001804 A1* | 1/2024 | Ionescu | G01R 31/382 | |
| 2024/0088700 A1* | 3/2024 | Kahn | H02J 7/0024 | |
| 2024/0146073 A1* | 5/2024 | von Novak | H02J 7/0048 | |

OTHER PUBLICATIONS

International Search Report and Written Opinion on PCT/IB2024/061582 dated Mar. 11, 2025.

* cited by examiner

ACTIVE ENERGY BALANCING FOR ENERGY STORAGE SYSTEMS

BACKGROUND

Devices can store energy for use at a later time and can undergo charge and discharge cycles as energy is stored in and released from the devices.

SUMMARY

The technical solutions of this disclosure overcome inefficiencies in charge and discharge cycles of ESSs by providing systems, methods and circuits to actively transfer energy between battery nodes (e.g., battery cells, modules, or packs) to equalize their respective energy levels. Charge and discharge cycle inefficiencies can arise because of diverse conditions and characteristics of different battery nodes in an ESS. These disparities can lead to performance and SOC level variations between battery nodes during the charge and discharge cycles, which can often be limited by the characteristics of the weakest battery cells. The technical solutions overcome these challenges by providing inductor-based charge storing circuits, controlled by transistors, between battery cells to facilitate energy transfer for active energy balancing between battery cells battery cell, module or packs. By providing energy balancing to overcome variations in performance among different battery cells, the technical solutions improve the overall efficiency and performance of energy storage systems, leading to their energy savings and an extended useful life.

At least one aspect of the technical solutions is directed to a system. The system can include a circuit coupled with a first battery cell and a second battery cell. The circuit can include a charge unit to store energy transferred between the first battery cell and the second battery cell. The circuit can include a first node of the charge unit coupled with the first battery cell and with the second battery cell and a second node of the charge unit coupled with a first transistor. The circuit can include a second transistor coupled with the second node. The first transistor and the second transistor can control a first transfer of the energy from a first one of the first battery cell and the second battery cell to the charge unit to store the energy. The first transistor and the second transistor can control a second transfer of the energy from the charge unit to a remaining one of the first battery cell and the second battery cell.

At least one aspect of the technical solutions is directed to a method. The method can include providing, by a circuit coupled with a first battery cell and a second battery cell, a charge unit for storing energy transferred between the first battery cell and the second battery cell. The method can include coupling, by the circuit, a first node of the charge unit with the first battery cell and with the second battery cell. The method can include coupling, by the circuit, a second node of the charge unit with a first transistor and with the second transistor. The method can include controlling, by the circuit, a first transfer of the energy from a first one of the first battery cell and the second battery cell to the charge unit to store the energy. The method can include controlling, by the circuit, a second transfer of the energy from the charge unit to a remaining one of the first battery cell and the second battery cell.

At least one aspect of the technical solutions is directed to an energy storage system. The energy storage system can include a circuit for energy transfer between a first battery cell and a second battery cell of the energy storage system. The circuit can include a charge unit to store energy transferred between the first battery cell and the second battery cell, the charge unit comprising. The circuit can include a resistor disposed between the first node and the second node and an inductor disposed between the first node and the second node and arranged in parallel with the resistor. The circuit can include a first node of the charge unit coupled with a positive terminal of the first battery cell and with a negative terminal of the second battery cell. The method can include a first transistor coupled with a second node of the charge unit and a second transistor coupled with the second node of the charge unit, The first transistor and the second transistor can control transfer of the energy between the first battery cell and the second battery cell, via the inductor.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
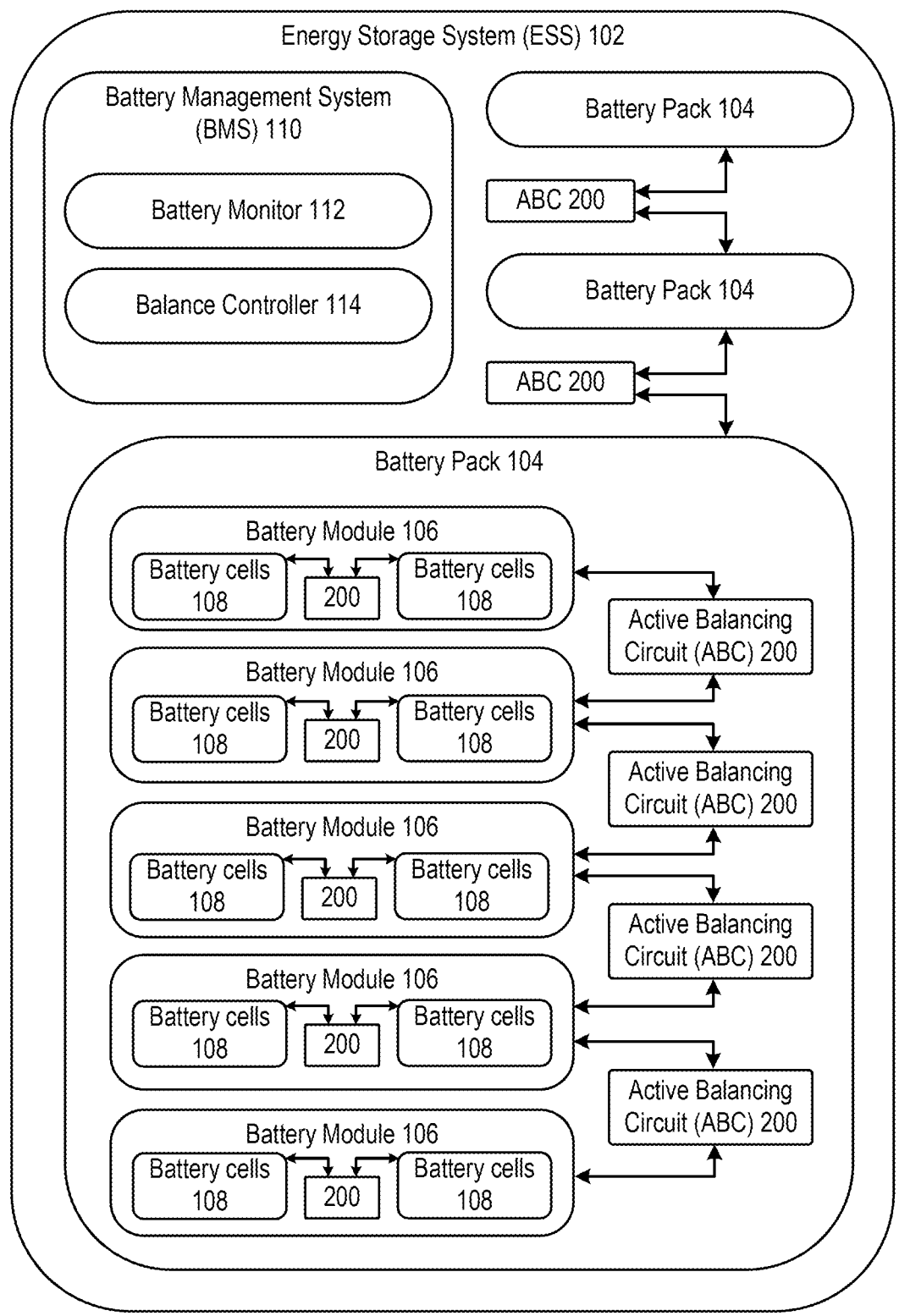
FIG. 1 illustrates an example of a system having one or more energy storage systems (ESSs) energy balanced by active balancing circuits.

Following below are more detailed descriptions of various concepts related to, and implementations inductor circuit based battery energy balancing to improve efficiency of energy charging and discharging cycles in energy storage systems (ESSs). The various concepts introduced above and discussed in greater detail below may be implemented in any of numerous ways. This disclosure generally relates to systems and methods for active energy balancing, including without limitation, active energy balancing of battery cells, modules or packs in ESSs.

Systems and methods described herein are generally directed to circuits, systems and methods for energy balancing of battery nodes, including battery cells, modules and packs of one or more energy storage systems (ESSs). Different ESSs can include various configurations of battery cells, modules or packs to store and provide energy for a variety of devices, systems and applications. As individual battery nodes vary in their condition and operational characteristics, inefficiencies can arise during ESS operation, including in charge and discharge cycles.

Energy storage systems (ESSs) can be designed in a variety of ways and for a variety of applications. An ESS can include any number of battery cells arranged into battery modules or packs. As ESSs are subjected to charge and discharge cycles in which energy is either stored or used, the overall energy capacity of the ESS can be constrained by the characteristics of its weakest batteries. However, different battery nodes in the ESS, such as battery cells in an extended life or a second life ESS, can be subject to different types of uses and exhibit varying performance characteristics, thereby impacting charging and discharging efficiencies of the ESS. For instance, during a charge cycle, a charging process of the ESS can be halted when the first battery cell in the array reaches 100% state of charge (SOC), even if other batteries have not yet reached their full charge. Similarly, in a discharge cycle, the discharge process can conclude when the SOC of a first battery hits 0%, disregarding potential energy remaining in other battery cells. These disparities can exacerbate inefficiencies in energy utilization and performance during charge and discharge cycles, limiting the ability of the ESS to utilize its entire energy capacity.

The solutions in this disclosure overcome these challenges by introducing circuitry designed for energy transfer for active energy balancing between battery cells, modules, or packs (referred to collectively as batteries) of an ESS, thereby improving the efficiency and performance of the ESS and improving energy savings and ESS's extended useful life. The proposed technical solutions offer versatile configurations to provide energy balancing functionality to individual battery cells, modules, or packs. For instance, an inductor-based charge storing circuit can be integrated between two battery cells within a single module, utilizing transistor control to control energy transfer between the cells. A series of inductor-based charge storing circuits can be coupled with multiple battery cells in a single or across several modules, facilitating energy transfer across a broader array of batteries. These solutions significantly can allow for improved energy efficiency of ESSs in extended life or second life applications, accommodating performance variations between diverse battery cells and enabling the ESS to fully harness its energy capacity in both charge and discharge operations.

FIG. 1 illustrates an example of a system 100 having one or more energy storage systems (ESSs) 102 energy balanced by active balancing circuits (ABCs). ESS 102 can include one or more battery management systems (BMSs) 110 and one or more battery packs 104 including a plurality of plurality of battery cells 108. BMS 110 can include one or more battery monitors 112 and balance controllers 114. Battery packs 104 can include one or more battery modules 106 including a plurality of battery cells. ESS 102 can include any number of active balancing circuits (ABCs) 110 that can be deployed between (e.g., be electrically coupled with) any number of, or any combination of, battery packs 104, battery modules 106 or battery cells 108.

ESS 102 can include a system or device that uses an arrangement of battery cells 108 to store (e.g., charge) and release (e.g., discharge) electrical energy. ESS 102 can include a system for providing a set amount of power (e.g., watts), or set voltage or current, depending on the design. ESS 102 can be deployed with, or be connected to, various systems or devices to provide energy or power to facilitate their operation. ESS 102 can be deployed or used in various sectors, such as renewable energy installations to store and provide renewable energy, electric vehicles (EVs) to power EV operation, and grid systems, such as commercial or residential energy storage. ESS 102 can be included, provided or deployed in commercial or industry applications, such as, second-life backup power to provide energy during electrical grid power outage. ESS 102 can be included, provided or deployed in off-grid power system applications, telecommunication infrastructure applications, emergency backup systems and lighting applications. In renewable energy applications, ESS 102 can store excess power generated during peak times for use during periods of low energy production. In electric or industrial vehicles, ESS 102 can provide power for operation, extend driving range, and manage charging cycles. In electrical grid systems, ESS 102 can provide power to address fluctuations in energy supply and demand to improve power stability.

ESS 102 can include any combination of one or more battery packs 104, battery modules 106 and battery cells 108. An ESS 102 can include a plurality of battery packs 104, where each of the battery packs 104 can include any number of battery cells. A battery pack 104 can include, for example, up to two, four, six, eight 10, 20, 50, 100, 1000, or more than 1000 battery cells 108, arranged in any combination of series or parallel arrangements, depending on the design. Battery packs 104 can include any number of battery modules 106. Battery module 104 can include one or more battery cells 108. For instance, a battery module can include at least two, four, six, eight, 10, 20, 50, 100, 1000, or more than 1000 battery cells 108, which can be arranged in any combination of series of parallel arrangements, depending on the design.

Battery cells 108 can include an element in an ESS for storing and releasing electrical energy through chemical reactions. Battery cell 108 can include any self-contained electrochemical device that stores and releases electrical energy through reversible chemical reactions between its positive and negative electrodes. Battery cell 108 can include terminals, such as positive and negative terminals which can be electrically coupled with external components, circuits or nodes. Battery cell 108 can include one or more electrolytes and separators to facilitate the flow of ions between electrodes of the battery cell 108 during charge and discharge cycles. Battery cell 108 can include any type of a battery cell, such as a lithium-ion (Li-ion) battery cell 108, nickel-cadmium (NiCD) battery cell 108, lead-acid battery cells 108, nickel-metal hydride (NiMH) battery cell 108, sodium-ion battery cell 108, magnesium ion battery cell 108 or graphene based battery cell 108.

Battery cells 108 can vary in their use, operation and characteristics. For instance, battery cells 108 can vary in their state of health (SOH), available energy capacity or charging or discharging efficiency. Battery cells 108 can vary between each other in their respective temperature sensitivities, chemical stability, self-discharge rate or cycle life. Battery cells 108 can vary in their respective voltage characteristics and internal resistances. These variations, depending on the design, may impact the difference in the rate or efficiency of charge or discharge of individual battery cells 108, battery modules 106 or battery packs 104 in an ESS 102, potentially adversely affecting the efficiency of the ESS 102 performance.

Active balancing circuit (ABC) 110, also referred to as the inductor shuttle circuit, can include any combination of electrical components (e.g., resistors, transistors, inductors, and capacitors) configured or arranged to transfer energy between different battery nodes (e.g., cells 108, modules 106 or packs 104). ABC 200 can include arrangement of circuits or elements, such as inductors or capacitors, to receive or store energy from a first battery cell 108, modules 106 or a pack 104 and release it to another battery cell 108, module 106 or a pack 104. ABC 200 can be electrically coupled between terminals of battery cells 108, modules 106 or packs, in instances in which one cell 108, module 106 or a pack 104 stores a surplus or excess of energy, during an ESS 102 charge or a discharge cycle. In such instances, ABC 110 can receive, capture or store energy from such a cell 108, module 106 or a pack 104 and provide it to another battery cell 108, module 106 or a pack 104 that has a deficit of energy during the charge or discharge cycle. By incorporating components, such as transistors, the ABC 110 can include the functionality to control the timing and the process of the energy transfer, facilitating energy distribution and energy balancing across the entire ESS 102 during charge, storage and discharge operations.

Battery management system (BMS) 110 can include any combination of hardware and software for managing operation of the ESS 102, including providing energy balancing between battery nodes (e.g., battery cells 108, modules 106 or packs 104). BMS 110 can include circuitry for implementing charging and discharging of the battery nodes (e.g., 104, 106 and 108), including circuits to protect from overcharging, provide energy balancing, prevent from excessive temperature and operate within particular operational ranges of power, current or voltage. BMS 110 can include battery monitor 112 for monitoring characteristics of the battery nodes, such as state of charge (SOC), state of health (SOH), temperature, voltage and current. BMS 110 can include balance controller 114 to control and implement active energy balancing between the battery nodes, based on determinations of their respective states and conditions.

Battery monitor 112 can include any combination of hardware and software to monitor or track operational parameters or characteristics of battery cells 108 (e.g., 212 or 214), battery modules 106 and battery packs 104. The monitoring can include tracking parameters related to battery cells to ensure their target performance, safety, and efficiency. For any battery cell 108, module 106 or pack, battery monitor 112 can monitor the voltage, which can indicate the state of charge and can correspond to the stored energy. Battery monitor 112 can monitor the SOC that can correspond to the current capacity and the remaining capacity of the battery node. Battery monitor 112 can monitor SOH that can be indicative of the overall battery condition. Battery monitor 112 can monitor temperature that can be relevant for safety and performance determinations. Battery monitor 112 can monitor the current, such as charge or discharge currents to and from the battery node, which can correspond to charging or discharging rates.

Balance controller 114 can include any combination of hardware and software for controlling the operation of battery nodes (e.g., cells 108, modules 106 and packs 104). Balance controller 114 can control the implementation of the energy balancing based on the monitored parameters and operational characteristics determined or detected by the battery monitor 112. Balance controller 114 of the BMS 110 can coordinate and control different ABCs 200 coupled with or deployed with various battery nodes of the ESS 102 (e.g., cells 108, modules 106, or packs 104). Balance controller 114 can generate, control and provide control inputs 262 and 264 for each of the ABCs 200. Control inputs 262 and 264 can be provided and timed for transistors 232 and 234 of the ABCs 200 to time and implement the energy transfer cycles (e.g., 310). For instance, balance controller 114 can receive monitored information from battery monitor 112 and control charging and discharging processes, energy balancing between battery cells 108, preventing overcharging of individual cells to improve the overall health and longevity of the ESS 102.

Figure 2:
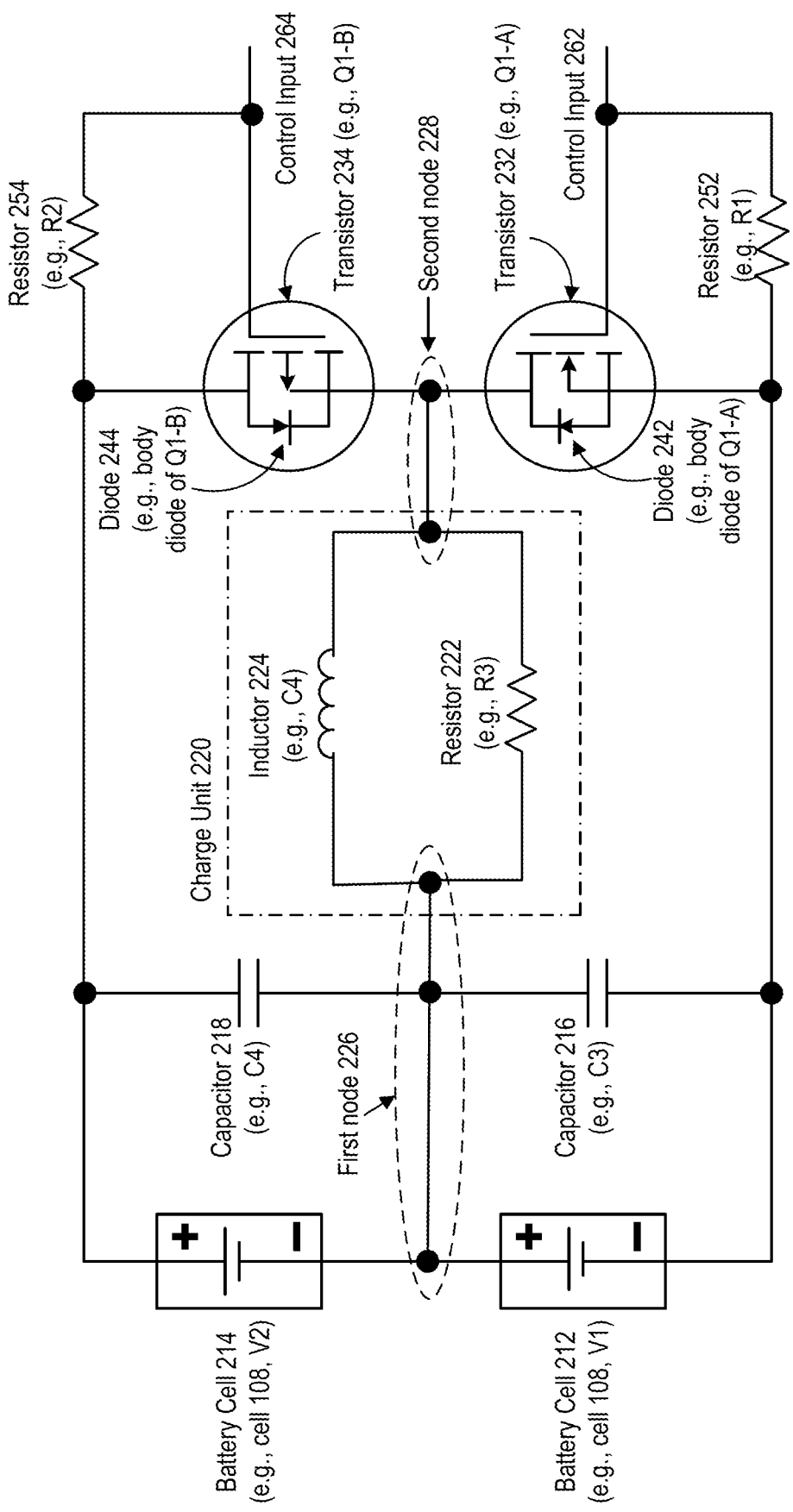
FIG. 2 illustrates an example of an active balancing circuit to transfer energy between battery nodes of an ESS, including battery cells, modules 106 or packs.

FIG. 2 illustrates an example of an active balancing circuit (ABC) 200 for implementing transfer of energy between various battery nodes of an ESS 102, including between battery cells 108, modules 106 or packs 104. As shown in the illustrated example, ABC 200 can include, or can be coupled with, battery cells 108, such as battery cells 212 and 214. Depending on the configuration, instead of the battery cells 108 (e.g., cells 212 or 214), the ABC 200 can be coupled with, or disposed between, two battery modules 106 or battery packs 104. ABC 200 can include capacitors 216 and 218 and a charge unit 220. Charge unit 220 can include an inductor 224 and a resistor 222 arranged in parallel between a first node 226 and a second node 228. ABC 200 can include a pair of transistors, including a transistor 232 (e.g., Q1-A) and transistor 234 (e.g., Q1-B) to coordinate or control the energy transfer between the battery cells 212 and 214, via the charge unit 220. Transistor 232 can an n-type or a p-type metal oxide semiconductor field effect transistor (MOSFET) that can be coupled with, or include, a diode 242, such as a body diode (e.g., inherent diode formed within the structure of the MOSFET) or a flyback diode (e.g., diode to provide a path for a reverse current). Transistor 234 can include an n-type or p-type MOSFET that can be coupled with, or include, a diode 244 (e.g., a body diode or a flyback diode). For instance, transistors 232 and 234 of an ABC 200 can include any combination of p-type and n-type configurations, including both transistors being p-type or n-type, or either one of the transistors being p-type, while the remaining one is n-type. ABC 200 can include a control input 262 for controlling transistor 232 and a resistor 252 connected to the control input 262. ABC 200 can include a control input 264 for controlling transistor 234 and a resistor 254 connected to the control input 264.

Although illustrated example shows ABC 200 electrically coupled with battery cells 212 and 214, it is understood that depending on the construction and design, ABC 200 can be coupled with any combination of battery cells 108, battery modules 106 or battery packs 104. The first node 226 of the charge unit 220 can be coupled with a positive terminal of the battery cell 212 (e.g., battery terminal indicated by a plus sign). The first node 226 can be electrically coupled with a negative terminal of the battery cell 214, which can be indicated by a minus sign. The first node 226 can be electrically coupled with a capacitor 216 (e.g., C3) that can be in a parallel configuration or arrangement with a battery cell 212 (e.g., V1). The first node 226 can be electrically coupled with a capacitor 218 (e.g., C4) that can be in a parallel configuration or arrangement with a battery cell 214 can each be electrically coupled with a first node 226 of the ABC 200. Capacitors 216 and 218 can have values suitable for various purposes, such as filtering and smoothing, energy storage, power factor correction, transient suppression of voltage spikes or to affect the frequency response of the circuit.

Charge unit 220 can include any combination of circuit elements to facilitate receiving charge or energy from one battery cell 108, module 106 or pack 104, storing such a charge or energy and providing or transferring the stored charge or energy to another battery cell 108, module 106 or a pack 104. Charge unit 220 can include a resistor 222 in parallel with an inductor 224. Resistance values of resistor 222 can vary widely, depending on the implementation, such as for example anywhere between 1 ohm and 1M ohm. Inductance values of inductor 224 can vary widely based on implementation, such as anywhere between a microhenry to hundreds of millihenries. Depending on the design, charge unit 220 can include or utilize one or more capacitors instead of the inductor 224, which can be arranged in any parallel and series configuration.

Second node 228 can include an electrical node that is on the other side of the charge unit 220. Second node 228 can electrically couple with the inductor 224 and resistor 222 as well as with transistors 232 and 234. For instance, second node 228 can couple with a drain terminal of the MOSFET transistor 232 and a drain terminal of the MOSFET transistor 234. Source terminal of transistor 232 can be electrically coupled with a node of the negative terminal of the battery cell 212 (e.g., terminal indicated by a minus sign of the V1 battery cell). Source terminal of transistor 232 can be electrically coupled with resistor 252, which can also be coupled with control input 262 for controlling the gate terminal of the transistor 232. Diode 242 can include a body diode (e.g., inherent diode of a MOSFET), or a flyback diode for providing reverse current across the transistor 232 when transistor 232 is turned off. The reverse current across diode 242 can be provided, for example, when energy stored in the inductor 224 of the charge unit 220 is discharged to the battery cell 212, via diode 242, such as responsive to a control input 264 of transistor 234.

Source terminal of transistor 234 can be electrically coupled with a node of the positive terminal of the battery cell 214 (e.g., terminal indicated by a plus sign of the V2 battery cell). Source terminal of transistor 234 can be electrically coupled with resistor 254, which can also be coupled with control input 264 for controlling the gate terminal of the transistor 232. Diode 244 can include a body diode (e.g., inherent diode of a MOSFET), or a flyback diode for providing reverse current across the transistor 234 when transistor 234 is turned off. The reverse current across diode 244 can be provided, for example, when energy stored in the inductor 224 of the charge unit 220 is discharged to the battery cell 214, via diode 244, such as responsive to a control input 262 of transistor 232.

ABCs 200 can include any combination of a transistor logic and an arrangement of one or more resistors, inductors and capacitors (RLC) to provide or facilitate one or more reactance components (e.g., one or more, or any combination of, inductors or capacitors) to act as a temporary energy storage medium for transferring energy between adjacent battery nodes. ABC 200 can include two distinct operations that can occur depending on the intended direction of the balancing operation. Each ABC 200 can be coupled with at least two or more battery nodes (e.g., battery cells 108, modules 106 or packs 104). ABC 200 can be controlled, via its transistors 232 (e.g., Q1-A) and 234 (e.g., Q-1B) to transfer energy, via an inductor 224, between the two battery, either from the first battery node (e.g., V1) to a second battery node (e.g., V2), or from the second battery node (e.g., V2) to the first battery node (e.g., V1).

To present an example of an active balancing by ABC 200, a north-south convention can be used. For instance, the "north" balancing operation can correspond to energy transferred to a battery node with a higher index (e.g., from 212 or V1 to 214 or V2), while a "south" balancing operation corresponds to energy transfer to a node with a lower index (e.g., from 214 or V2 to 212 or V1). While in the illustrated example the ABC 200 is connected to only two battery cells whose energy transfer is controlled by two transistors, it is understood that additional energy nodes and additional transistors can be added, along with any ancillary circuitry, to facilitate energy transfer between more than just two battery cells, depending on the design.

For instance, an energy transfer from one battery node (e.g., cell, module or pack) to another, can include a north energy transfer (e.g., energy transfer to a higher index battery node). In such an example, a transistor 232 can turn on, triggering a transfer of energy from battery node (e.g., 108 or 212) into the inductor 224 of the inductor based charge unit 220. As the transistor 232 turns off, the energy stored in inductor 224 can be released from inductor 224 into battery cell 214 via body diode 244 of the transistor 234. This can be referred to as a north energy transfer (e.g., from V1 to V2).

For instance, a south energy transfer can be implemented from a battery node of a higher index to a battery node of a lower index (e.g., from V2 to V1). The transfer can be implemented via the inductor 224. In this example, transistor 234 (e.g., Q1-B) can turn on, triggering a transfer of energy from battery node or cell 214 into the inductor 224 of the charge unit 220. As the transistor 234 turns off, the energy stored in inductor 224 can be released from inductor 224 into battery node (e.g., 108 or 212) via a body diode 242 of the transistor 232.

Figure 3:
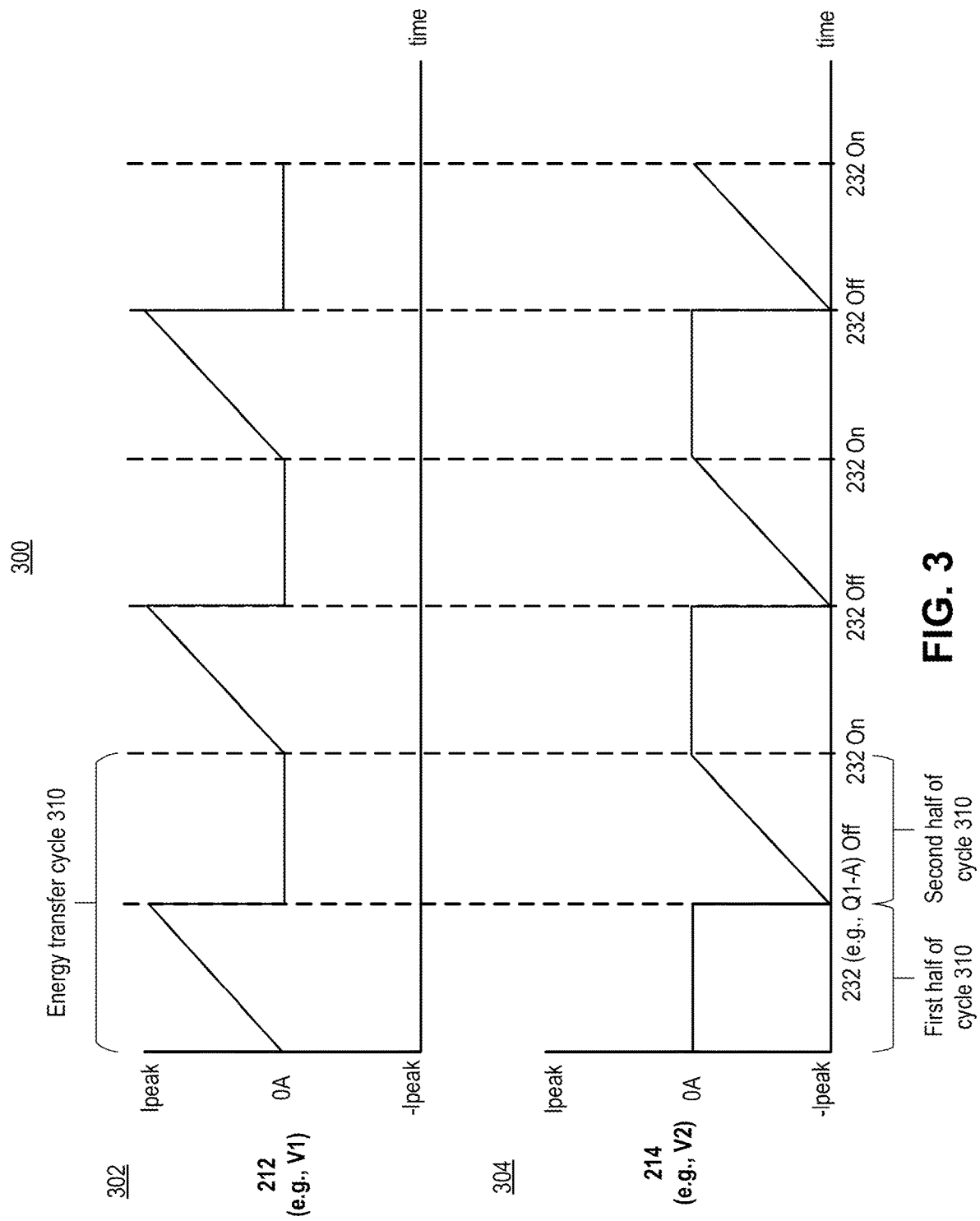
FIG. 3 illustrates example of graph plots of cell currents for energy transfer between two battery nodes.

FIG. 3 illustrates example 300 of graph plots 302 and 304 of cell currents for an energy transfer operation between two battery nodes (e.g., battery cells 108, modules 106 or packs 104). Example 300 can correspond to a north-balancing operation in which energy is transferred from battery cell 212 (e.g., V1) to battery cell 214 (e.g., V2) of FIG. 2. In example 300, the positive current (e.g., above GA) can represent a cell discharging and the negative current can represent a cell charging.

In example 300, individual cells can include balancing battery nodes, which can include any number of cells 108 or modules 106. Energy can be transferred between battery nodes (e.g., 212 and 214) in energy transfer cycles 310. Each individual cycle 310 can include a transistor (e.g., 232 or 234) turning on and off to trigger an action of the ABC 200. A first half of such an inductor shuttle cycle 310 can be referred to as a "tick", during which transistor (e.g., 232) can be turned "on" and at the end of which it can be turned off. The second half of the energy transfer cycle 310 can be referred to as a "tock", during which transistor (e.g., 232) can be turned off and at the end of which it can be turned back on (e.g., to start the next cycle 310). For instance, in the plots 302 and 304, transistor 232 (e.g., Q1-A) is turned on during the first half of the cycle 310 and turned off during the second half of the cycle 310.

Figure 4:
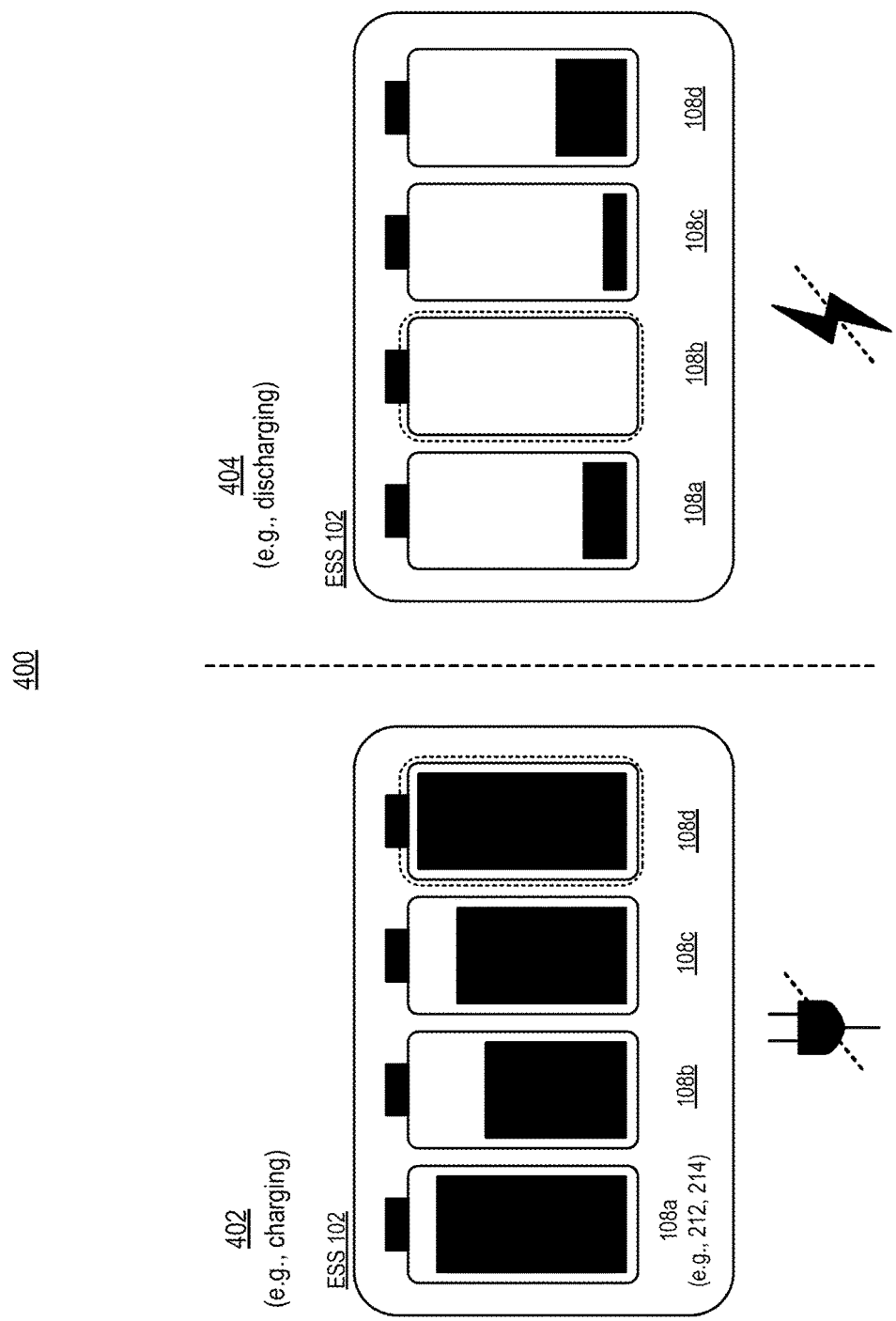
FIG. 4 illustrates an example of battery cells having varying characteristics and conditions, affecting charge and discharge cycles of an ESS.

FIG. 4 illustrates an example 400 of battery cells 108a-d (e.g., including battery nodes, such as 212 or 214) of an ESS 102, having with varying characteristics and conditions, affecting charge and discharge cycles of the ESS 102. As illustrated in example 400, an ESS 1502 can have its overall capacity limited by the weakest cell 108 (e.g., 212 or 214) in the system given that charging or discharging halts after a single cell reaches either 100% SOC during a charge cycle or 0% SOC during a discharge cycle. This can result in inefficiencies during both the charge and discharge processes as available capacity cannot be utilized.

In views 402 and 404 of example 400, ESS 102 can have four battery cells (e.g., or battery nodes), such as 108a, 108b, 108c and 108d, each of which can have different performance characteristics or conditions. As shown in view 402 of example 400, during a charge cycle, battery cell 108d can be the first cell in the ESS 102 (e.g., or its module 106 or pack 104) to reach the 100% SOC and be fully charged. As a result, other battery cells 108 (e.g., of the same module or pack), such as cell 108b may be insufficiently charged. As shown in view 404 of example 400, during a discharge cycle, battery cell 108b can be the first cell in the ESS 102 to reach the 0% SOC and be fully discharged. As a result, other battery cells 108, such as cell 108d, can may be insufficiently discharged and still store some energy. These variations in battery cell conditions and performance can cause inefficiencies during battery operation.

To mitigate such issues, BMS 110 described herein can employ a cell-level balancing system to equalize cell SOCs. While this may help facilitate the energy balancing, the rate at which balancing occurs can be limited by the module cell taps. The BMS 110 described herein can include module-level balancing, where energy can be transferred between modules 106. This can allow for faster balancing rates, given module terminals support higher current values. The BMS 110 can include pack-level balancing, in which energy can be transferred between packs 104, which can facilitate faster balancing rates than those of modules or cells, as pack terminals can support higher currents than module terminals.

To mitigate the issues, such as those illustrated in FIG. 4, a battery management system can be used to employ a cell-level balancing system to equalize cell SOCs. While this may help facilitate the energy balancing, the rate at which balancing occurs can be limited by the module cell taps. The BMS 110 can include module-level balancing, where energy can be transferred between modules 106 or packs 104. This can allow for faster balancing rates, given module terminals can support higher current values. ABC 200 circuits for modules 106 or packs 104 can include reactance components (e.g., inductors or capacitors) having higher value components to facilitate operation at the given module or pack level.

For instance, ESS 102 can experience inefficiencies due to varying performance characteristics of the individual battery cells 108 or other nodes of the ESS, such as modules or packs. During the charge and discharge cycles 310 of the ESS 102, the energy capacity of the system can be limited by the characteristics of weakest batteries in the system. For example, during a charge cycle 310 of the ESS 102, the charging process can stop when a first of the plurality of battery cells reaches 100% of the SOC, even if the remaining batteries have yet reached their full charge (e.g., 100% of SOC). During the discharge cycle, the discharging process can end when a first of the plurality of battery cells reaches 0% SOC, even if remaining battery cell still have more charge stored. These discrepancies can result in energy and performance inefficiencies during the charge and discharge battery cycles, as available energy capacity cannot be utilized.

Depending on the ESS 102 design, the ESS 102 can experience a capacity fade in which the ESSs can gradually lose their ability to hold charge over time. There can be several cell characteristics that can cause or impact the capacity fade effect, such as, for example, diverging cell states of health (SOH), dissimilar cell coulombic efficiencies, dissimilar cell self-discharge rates or dissimilar cell temperature distributions. Sometimes, most battery cells after manufacturing can exhibit relatively uniform behavior. However, as the battery pack progresses through its lifecycle, differences in cell behavior can emerge due to cell degradation. The cell degradation can be non-uniform as it can be a function of environmental factors, usage history, and manufacturing impurities. ESSs designed for long life, or second life applications can include numerous batteries (e.g., battery cells, modules or packs) which can be subjected to various types of usage and environmental conditions, impacting the capacity fade experienced by different individual parts. These variations can exacerbate energy inefficiencies within the ESS, including those exhibited during the charge and discharge cycles.

To counter these effects, a BMS 110 can include a passive cell balancing system including circuits in which a resistor that can be utilized to selectively turn on (e.g., per control provided by a transistor) to spend the surplus energy and bleed off those battery cells 108 that first reach the 100% SOC levels. However, such passive cell balancing systems can spend additional energy from these battery cells to provide SOC equalization, since energy balance is achieved via the conversion of energy to heat through a resistor, causing more energy to be used to charge the ESS than what can be withdrawn while discharging. In addition, depending on the construction of the ESS, large amounts of current can only be drawn at the module level. Cell taps used in EV battery modules, in particular, can support little current, limiting the rate at which passive balancing can occur.

The technical solutions can include the ABCs 200 to provide a more efficient energy balancing, which can be implemented individually or in combination with the passive cell balancing system. For instance, each of the battery cells 108, modules 106 or packs 104 can include a passive cell balancing circuit in which a transistor can be activated (e.g., from a control signal from a balance controller 114) to activate a resistor to consume, spend or burn at least a portion of the surplus energy. The passive energy balance circuit can have its bleed resistor activated responsive to the balance controller 114 determining that a surplus energy is to be expended based on the monitor parameters provided by battery monitor 112. For instance, circuitry of the active balancing circuit 200 can be configured to balance the energy, along with an active balancing circuit at a battery cell level (e.g., across battery cells 108 within a module 106 or a pack 104), at a battery module level (e.g., across different modules 106 that include different battery cells 108) and at the battery pack level (e.g., between packs 104, each of which can include a plurality of modules 106 or cells 108, such as in a multi-pack ESS design).

Figure 5:
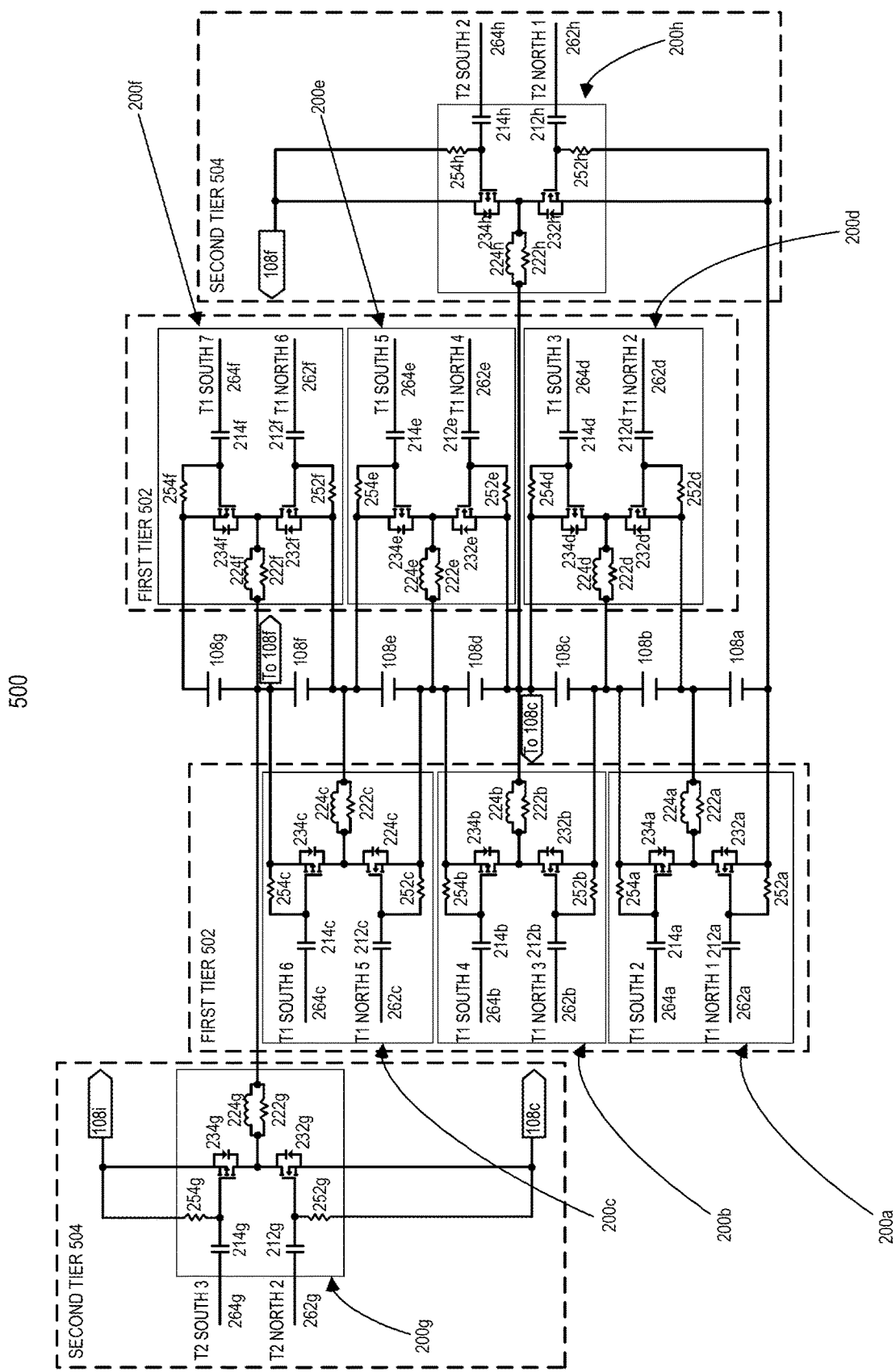
FIG. 5 illustrates an example system to provide an active balancing of energy between a plurality of battery nodes using multiple tiers of active balancing circuits 200.

FIG. 5 illustrates and example multi-tier active balancing circuit system 500 to provide an active balancing of energy between a plurality of battery nodes (e.g., battery cells 108, modules 106 or packs 104) using multiple tiers of active balancing circuits 200. Although example system 500 illustrates battery cells 108 as the battery nodes, it is understood that the same or similar configuration can be applied between battery modules 106 or packs 104 or any combination of battery cells 108, modules 106 and packs 104. Example system 500 can include a circuitry having one or more ABCs 200 organized, configured or arranged in multiple levels of operation to provide a more efficient and quicker active balancing of energy among any number of battery nodes (e.g., 2, 4, 8, 10, 50, 100, 1000 or more than 1000).

Example multi-tier active balancing system 500 can include two or more layers or tiers of active balancing circuits 200, which can be arranged or combined into a single system that transfers energy between various battery nodes, including between battery cells 108, modules 106 or packs 104. ABCs 200 across various levels or tiers can operate independently of each other and can have their operation be based on signals or control inputs 262 and 264 provided for each of the ABCs 200 from the balance controller 114 of the BMS 110.

While system 500 can vary based on implementation and configuration, in the illustrated example, system 500 can include six ABCs 200 operating in a first tier 502 and two ABCs operating in a second tier. First tier 502 and second tier 504 ABCs 200 can be coordinated to provide active energy balancing between battery nodes being energy balanced, such as seven battery cells 108 (e.g., 108a through 108g). System 500 can include first tier 502 circuitry having ABCs 200a, 200b, 200c, 200d, 200e and 200f, as well as a second tier 504 circuitry having ABC 200g and 200h. First tier 502 and second tier 504 circuitries can be coordinated by the BMS 110 to efficiently energy balance battery cells 108a, 108b, 108c, 108d, 108e, 108f and 108g, as well as additional battery nodes, such as battery cell 108i (e.g., coupled with ABC 200g of the second tier 504). In example 500, the first tier 502 can have ABCs 200 that operate on adjacent battery nodes, such as battery cells 108 of a single group of battery cells within a single module. The second tier 504 can operate on groups of three or more battery cells 108 in a series.

Each of the ABCs 200a-h can include the same or a similar configuration or arrangement as that of ABC 200 illustrated in FIG. 2. In the first tier 502, ABC 200a can be controlled via control inputs 262a and 264a that can be provided by the balance controller 114. Control inputs 262a and 264a can control and operate transistors 232a and 234a to trigger storing energy received from one battery cell 108 using the inductor 224a and the resistor 222a (e.g., the charge unit of ABC 200a), and then releasing the stored energy from the inductor 224a to the intended battery cell 108. ABC 200a can have resistor 252a and source of transistor 232a coupled with negative terminal of cell 108a. ABC 200a can have resistor 254a and source of transistor 234a coupled with positive terminal of cell 108b. The first node 226 of the inductor 224a and resistor 222a (e.g., the node away from transistors 232a and 234a) can be coupled with positive terminal of cell 108a and negative terminal of 108b, facilitating energy transfer at least between cells 108a and 108b over an energy transfer cycle 310. For instance, control input 262a can turn on a transistor 232a to trigger storing of energy from battery cell 108a into inductor 224a and then turn off the transistor 232a to release the stored energy into battery cell 108b, via a body diode (e.g., 244) of the transistor 234a. For instance, control input 264a can turn on a transistor 234a to trigger storing of energy from battery cell 108b into inductor 224a and then turn off the transistor 234a to release the stored energy into battery cell 108a, via a body diode (e.g., 242) of the transistor 232a.

ABC 200b can be controlled via control inputs 262b and 264b provided by the balance controller 114. Control inputs 262b and 264b can control and operate transistors 232b and 234b to trigger storing energy from one battery cell 108 using the inductor 224b and the resistor 222b (e.g., the charge unit 220 of ABC 200b), and then releasing stored energy from the inductor 224b to the intended battery cell 108. ABC 200b can have resistor 252b and source of transistor 232b coupled with negative terminal of cell 108c and positive terminal of cell 108b. ABC 200b can have resistor 254b and source of transistor 234b coupled with positive terminal of cell 108d and negative terminal of cell 108e. The first node 226 of the inductor 224b and resistor 222b can be coupled with positive terminal of cell 108c and negative terminal of 108d, facilitating energy transfer at least between cells 108c and 108d over an energy transfer cycle 310.

ABC 200c can be controlled via control inputs 262c and 264c provided by the balance controller 214. Control inputs 262c and 264c can control and operate transistors 232c and 234c to trigger storing energy from one battery cell 108 using the inductor 224c and the resistor 222c of the charge unit 220c, and then releasing stored energy from the inductor 224c to the intended battery cell 108. ABC 200c can have resistor 252c and source of transistor 232c coupled with negative terminal of cell 108e and positive terminal of 108d. ABC 200c can have resistor 254c and source of transistor 234c coupled with positive terminal of cell 108f and negative terminal of cell 108g. The first node 226 of the inductor 224c and resistor 222c can be coupled with positive terminal of cell 108e and negative terminal of 108f, facilitating energy transfer at least between cells 108e and 108f over an energy transfer cycle 310.

Also in the first tier 502, ABC 200d can be controlled via control inputs 262d and 264d that can be provided by the balance controller 214. Control inputs 262d and 264d can control and operate transistors 232d and 234d to trigger storing energy received from one battery cell 108 using the inductor 224d and the resistor 222d (e.g., the charge unit of the ABC 200d), and then releasing the stored energy from the inductor 224d to the intended battery cell 108. ABC 200d can have resistor 252d and source of transistor 232d coupled with negative terminal of cell 108b and positive terminal of cell 108a. ABC 200d can have resistor 254d and source of transistor 234d coupled with positive terminal of cell 108c and negative terminal of 108d. The first node 226 of the inductor 224d and resistor 222d (e.g., the node away from transistors 232d and 234d) can be coupled with positive terminal of cell 108b and negative terminal of 108c, facilitating energy transfer at least between cells 108b and 108c over an energy transfer cycle 310.

ABC 200e can be controlled via control inputs 262e and 264e provided by the balance controller 214. Control inputs 262e and 264e can control and operate transistors 232e and 234e to trigger storing energy from one battery cell 108 using the inductor 224e and the resistor 222e (e.g., the charge unit of the ABC 200e), and then releasing stored energy from the inductor 224e to the intended battery cell 108. ABC 200e can have resistor 252e and source of transistor 232e coupled with negative terminal of cell 108d and positive terminal of cell 108c. ABC 200e can have resistor 254e and source of transistor 234e coupled with positive terminal of cell 108e and negative terminal of cell 108f. The first node 226 of the inductor 224e and resistor 222e can be coupled with positive terminal of cell 108d and negative terminal of 108e, facilitating energy transfer at least between cells 108d and 108e over an energy transfer cycle 310.

ABC 200f can be controlled via control inputs 262f and 264f provided by the balance controller 214. Control inputs 262f and 264f can control and operate transistors 232f and 234f to trigger storing energy from one battery cell 108 using the inductor 224*f* and the resistor 222*f* of the charge unit of ABC 200*f*, and then releasing stored energy from the inductor 224*f* to the intended battery cell 108. ABC 200*c* can have resistor 252*f* and source of transistor 232*f* coupled with negative terminal of cell 108*f* and positive terminal of 108*e*. ABC 200*c* can have resistor 254*f* and source of transistor 234*f* coupled with positive terminal of cell 108*g*. The first node 226 of the inductor 224*f* and resistor 222*f* can be coupled with positive terminal of cell 108*f* and negative terminal of 108*g*, facilitating energy transfer at least between cells 108*f* and 108*g* over an energy transfer cycle 310.

In the second tier 504, ABC 200*g* can be controlled via control inputs 262*g* and 264*g* that can be provided by the balance controller 214. Control inputs 262*g* and 264*g* can control and operate transistors 232*g* and 234*g* to trigger storing energy received from one battery cell 108 (e.g., 108*c* or 108*i*) using the inductor 224*g* and the resistor 222*g* of the charge unit of ABC 200*g*. The control inputs can then trigger the transistors 232*g* and 234*g* to release the stored energy from the inductor 224*g* to the intended battery cell 108 (e.g., the remaining of the cell 108*c* or 108*i*). ABC 200*g* can have resistor 252*g* and source of transistor 232*g* coupled with a terminal of cell 108*c*. ABC 200*g* can have resistor 254*g* and source of transistor 234*g* coupled with a terminal of cell 108*i*. The first node 226 of the inductor 224*g* and resistor 222*g* (e.g., the node away from transistors 232*g* and 234*g*) can be coupled with positive terminal of cell 108*f* and negative terminal of 108*g*, facilitating energy transfer between the grouping of cells 108*d*, 108*e* and 108*f* and the grouping of cells 108*g* through 108*i*, over an energy transfer cycle 310.

ABC 200*h* can be controlled via control inputs 262*h* and 264*h* that can be provided by the balance controller 214. Control inputs 262*h* and 264*h* can control and operate transistors 232*h* and 234*h* to trigger storing energy received from one battery cell 108 (e.g., 108*a* or 108*f*) using the inductor 224*h* and the resistor 222*h* of the charge unit of ABC 200*h*. The control inputs can then trigger the transistors 232*h* and 234*h* to release the stored energy from the inductor 224*h* to the intended battery cell 108 (e.g., the remaining of the cell 108*a* or 108*f*). ABC 200*h* can have resistor 252*h* and source of transistor 232*h* coupled with a terminal of cell 108*a*. ABC 200*h* can have resistor 254*h* and source of transistor 234*h* coupled with a terminal of cell 108*f*. The first node 226 of the inductor 224*h* and resistor 222*h* (e.g., the node away from transistors 232*h* and 234*h*) can be coupled with positive terminal of cell 108*c* and negative terminal of 108*d*, facilitating energy transfer between the grouping of cells 108*a*, 108*b* and 108*c* and the grouping of cells 108*d*, 108*e* and 108*f*, over an energy transfer cycle 310. In doing so, ABCs 200 of the second tier 504 can facilitate a more efficient and quicker energy transfer between battery nodes (e.g., cells 108, modules 106 or packs 104) when they are not immediately connected to each other via ABCs 200. While system 500 shows example of only two tiers (e.g., 502 and 504), it is understood that more than two tiers of ABCs 200 can be utilized, including three, four, five, or more than five tiers of ABCs 200 for energy transfer between any number of battery nodes.

Figure 6:
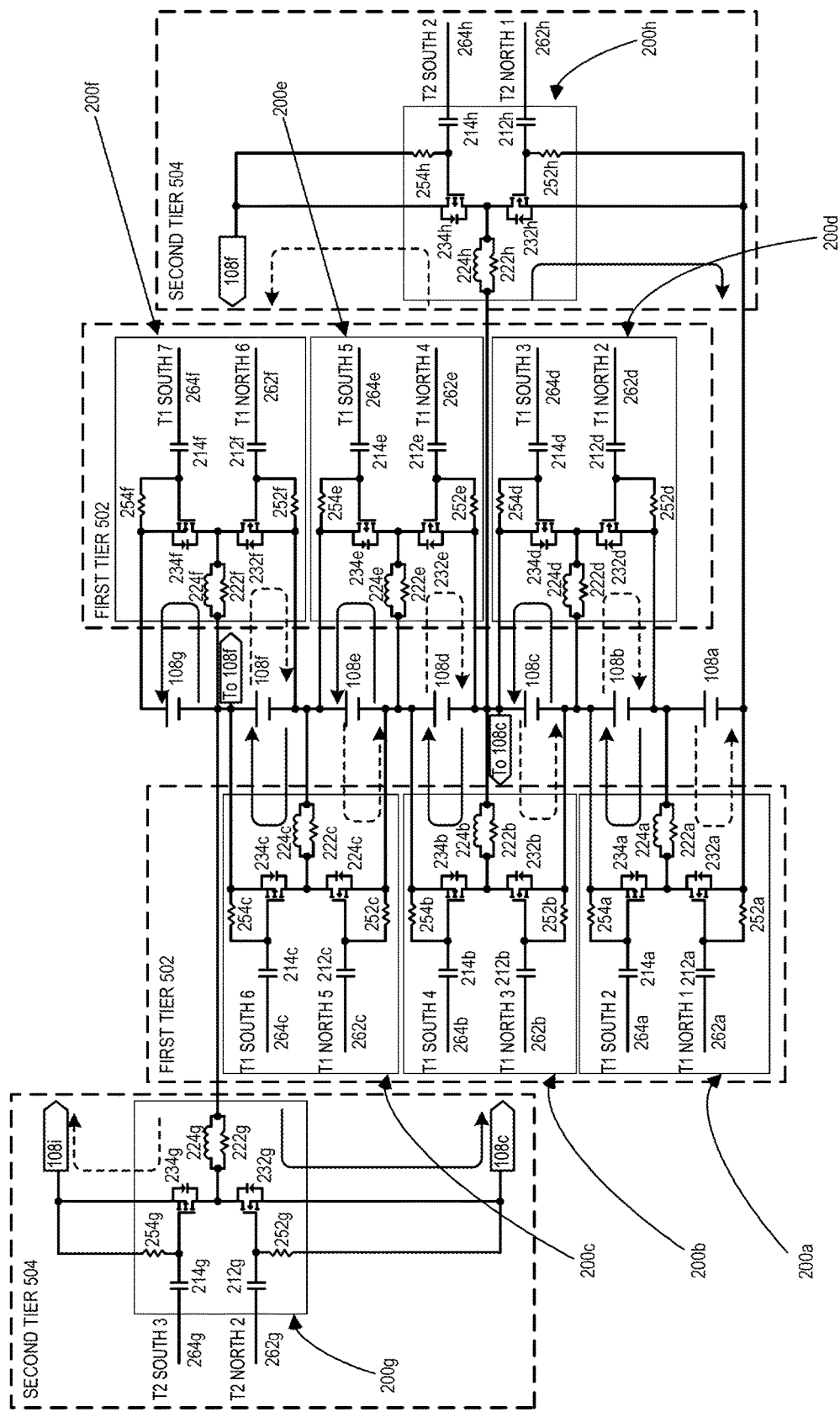
FIG. 6 illustrates an example of a multi-tier active energy balance circuit including multiple active balancing circuits operating through charge and discharge cycles.

FIG. 6 illustrates an example 600 of a multi-tier active energy balance circuit including multiple active balancing circuits operating through charge and discharge cycles 310. Example 600 illustrates a multi-tier energy transfer system 500 (e.g., from FIG. 5) in which two tiers of ABCs 200 (e.g., 502 and 504) are simultaneously operated. Control signals 262 and 264 can be phase shifted with respect to each other by 180 degrees (e.g., off-phase). For instance, control signals 262 and 264 of two ABCs 200 from two different tiers (e.g., a first tier 502 and a second tier 504) can be phase shifted between each other by 180 degrees. For example, to facilitate a north energy transfer from cell 108*c* to cell 108*d* via tier 1 ABC 200*b*, as well as an energy transfer from group of cells 108*a*, 108*b* and 108*c* to a group of cells 108*d*, 108*e* and 108*f* via tier 2 ABC 200*h*, control lines 262*b* of ABC 200*b* and 262*h* of ABC 200*h* can be set and operated at 180 degree phase shift (e.g., off phase) with respect to each other. Otherwise, the positive cell tap of cell 108*c* can experience a double influx of current during the first half 602 of the cycle as it can charge inductors 224*b* and 224*h* simultaneously.

By controlling the phases of the control signals 262 and 264, the balance controller 114 can control transistors 232 and 234 of the ABCs 200 during both halves of the cycle 310. For instance, during the first half (e.g., 602) of the cycle 310, a first transistor (e.g., 232) can be turned on and a second transistor (e.g., 234) can be turned off, providing energy transfer in between the battery cells 108 as indicated by the dotted arrow. During the second half of the cycle 602, a second transistor (e.g., 234) can be turned on and first transistor 232 can be turned off, providing energy transfer in between the battery cells 108 as indicated by the non-dotted line arrow. The resulting energy transfer can therefore utilize both the first half 602 and the second half 604 of the cycle 310 to continuously move energy between battery nodes, responsive to instructions transmitted via control signals 262 and 264 by the balance controller 114 of the BMS 110. For example, control signals 262*b* and 264*b* of the same ABC 200*b* can be phase-shifted with respect to each other, as it can, for example, eliminate the losses across the body diodes (e.g., 242 or 244).

Figure 7:
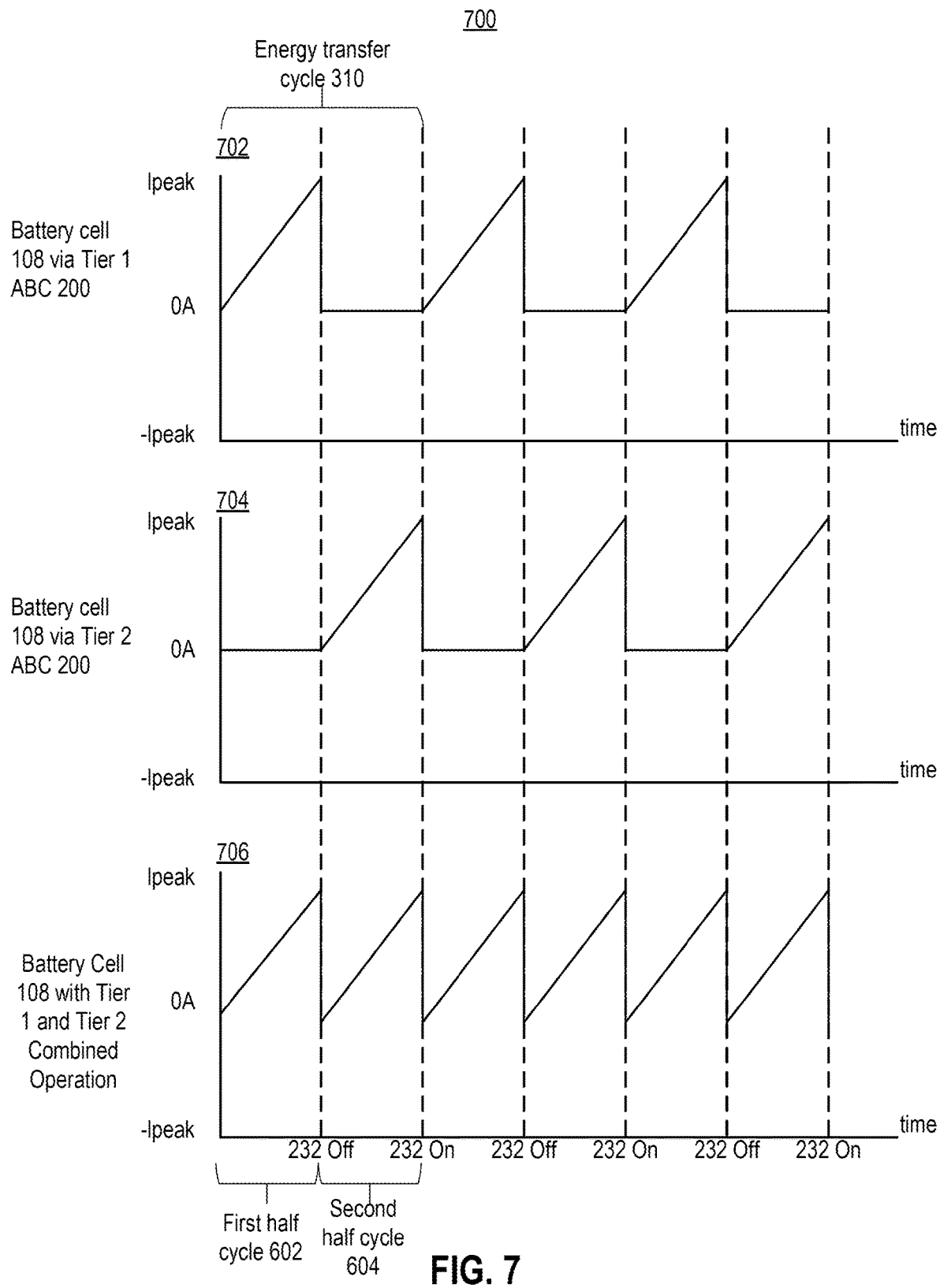
FIG. 7 illustrates an example of graph plots of cell currents for energy transfer operations of a multi-tier active energy balance system.

FIG. 7 illustrates an example 700 of graph plots 702, 704 and 706 of cell currents for energy transfer operations of a multi-tier active energy balance system. Example 700 can correspond to any energy balancing operation in which energy is transferred between battery cells 108 (e.g., 212 to 214 or 214 to 212) using ABCs 200 arranged in first tier 502 and second tier 504, as shown in examples 500 and 600. In example 700, depending on design, the positive current (e.g., above GA) can represent a battery cell 108 discharging or charging, while the negative current can represent the reverse operation from that of the positive current.

In plot 702 of the example 700, battery cell 108 can experience energy transfer, such as energy transfer into the battery cell 108 (e.g., charging). Energy transfer can be implemented between two battery cells (e.g., 212 and 214) during an energy transfer cycle 310, such as the one discussed in FIG. 3. During the cycle 310, a transistor (e.g., 232 or 234) of an ABC 200 can turn on and off to trigger an energy transfer. A first half cycle 602 can include turning off of a transistor (e.g., 232) to charge an inductor of a charge unit 220. A second half cycle 604 can include the transistor turning on to discharge the stored energy from the inductor to the intended battery cell 108. As such, in plot 702, a single energy transfer is implemented during a single cycle 310.

At plot 704, battery call 108 can experience another energy transfer during the off-phase or 180 phase shift, such that energy transfer is offset by a single half of cycle 310. At 704, battery cell 108 can receive another energy transfer when transistor is on, and a charge unit of another ABC 200 can be charged with transistor 232 is off. This can result in ABC 200 operating according to plot 704 providing energy when ABC 200 operating according to plot 702 is charging, while ABC 200 operating according to plot 704 charges when ABC 200 operating according to plot 702 is providing energy.

At plot 706, a combined operating of energy transfer from the operation at plot 702 and plot 704 is provided, thereby illustrating a combined first tier and second tier energy transfer. In such a scenario, the rate of energy transfer to a battery node or from a battery can be increased by a factor of two with respect to that of the energy transfer of a single tier ABC 200.

Figure 8:
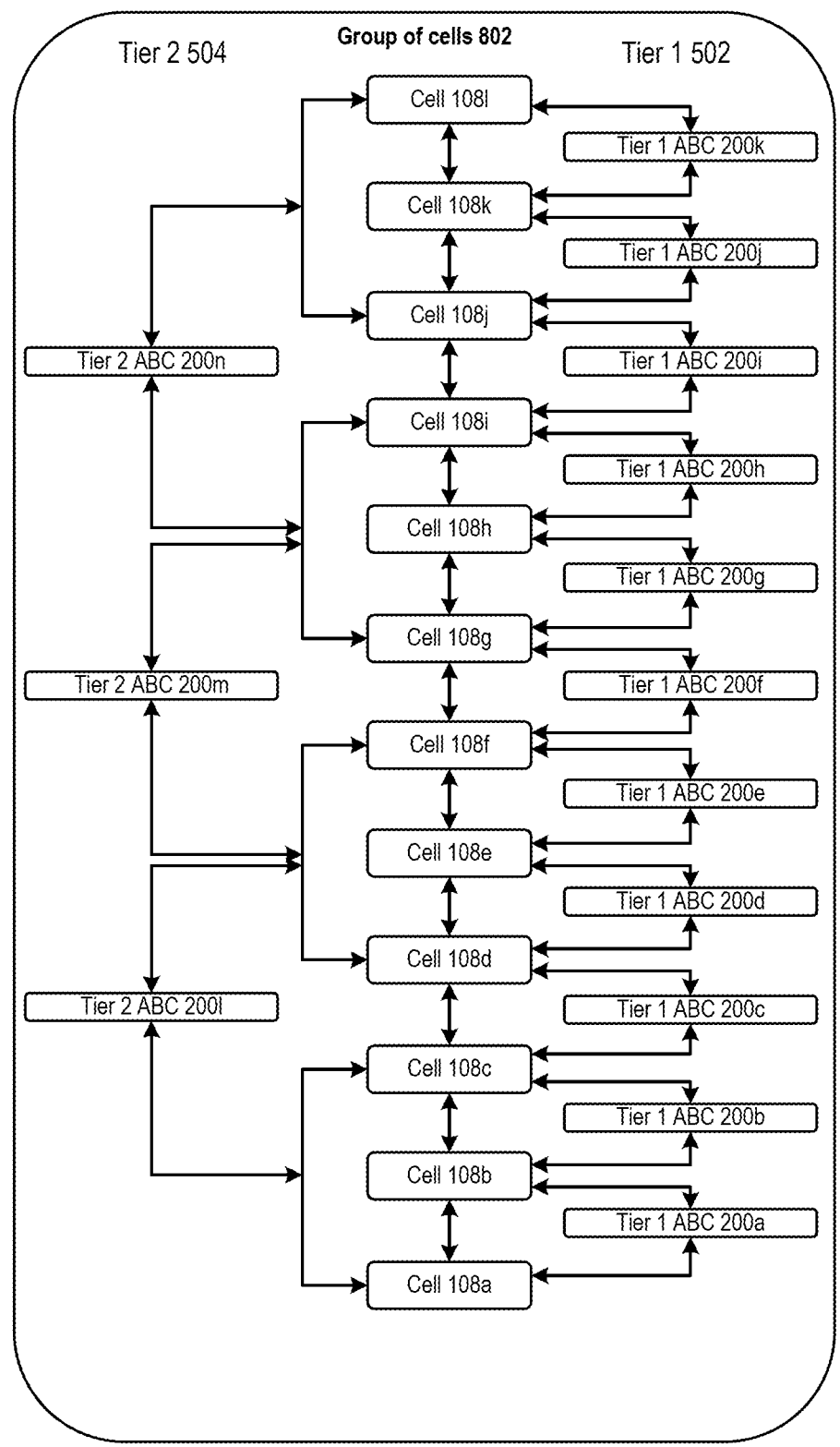
FIG. 8 illustrates an example of a group of cells that can be energy balanced by a multi-tier energy balance system or a circuit.

FIG. 8 illustrates an example 800 of a group of cells that can be energy balanced by a multi-tier energy balance system or a circuit. A group of battery cells 802 can include any number of battery cells 108 (e.g., 212 or 214 cells), such as twelve battery cells 108a-l. Each of the battery cells 108a-l can be coupled with at least two or more ABCs 200. ABCs 200a-k can be arranged in a tier one 502 arrangement. ABCs 200l-n can be arranged in a tier two 504 arrangement.

Each of the tier one ABCs 200a-k can be coupled with at least two of the adjacent battery cells 108 of the group of cells 802. For instance, ABC 200a can be coupled with cells 108a and 108b, while ABC 200b can be coupled with cells 108b and 108c, ABC 200c can be coupled with cells 108c and 108d and ABC 200d can be coupled with 108d and 108e. The same pattern can be followed for the entire of cells 108a-l and ABCs 200a-k of tier one 502.

Each of tier two ABCs 200l-n can be coupled with a group of three cells 108. For example, ABC 200l can be coupled with cells 108a and 108c on one end, as well as with cells 108f and 108d on the other. For example, ABC 200m can be coupled with cells 108d and 108f on the one end, as well as with cells 108g and 108i on the other. For instance, ABC 200n can be coupled with cells 108g and 108i on the one end, and with cells 108j and 108l on the other. In combination, ABCs 200 from tier one 502 and tier two 504 can balance energy or charge across each of the cells 108a and 108l efficiently, extending useful life and efficiency of the ESS 102.

Figure 9:
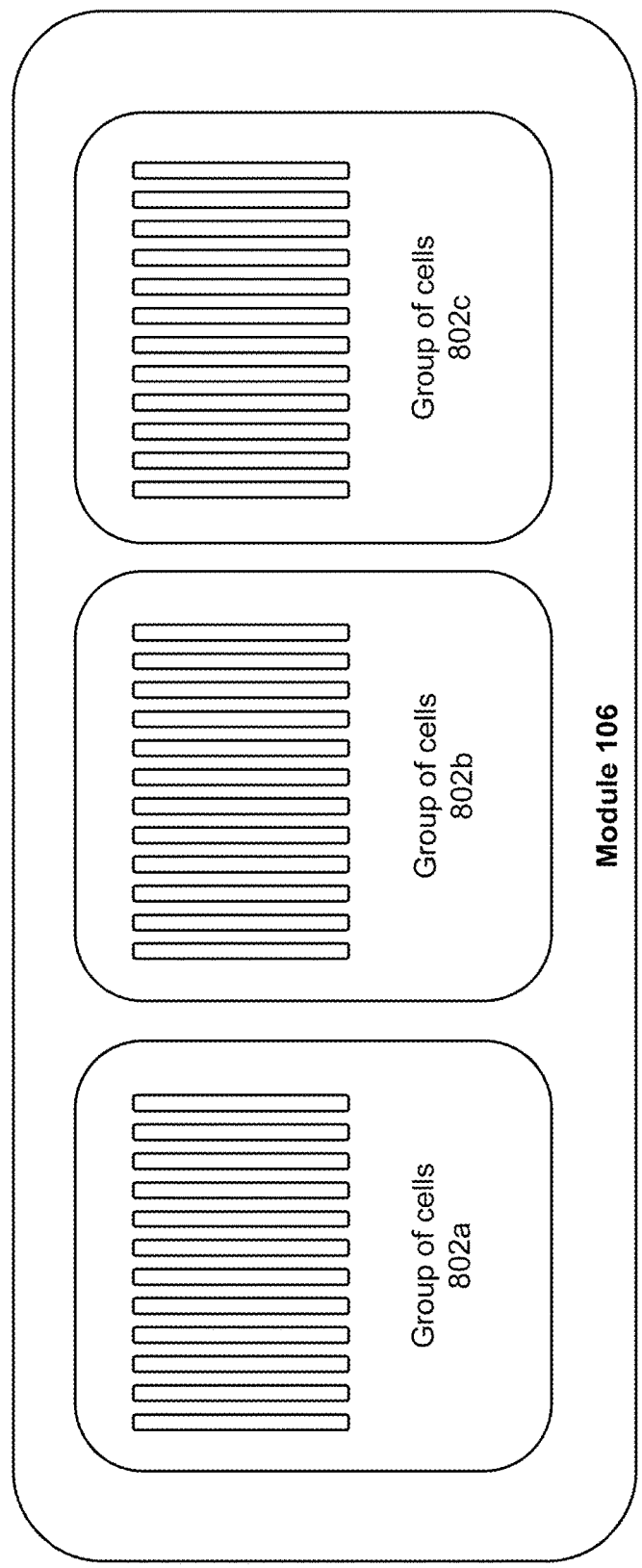
FIG. 9 illustrates an example of groups of cells arranged into a battery module.

FIG. 9 illustrates an example 900 of groups of cells 802 arranged into a module 106. For example, multiple groups of battery cells 802, such as that of example 800 in FIG. 8, can be arranged into a module 106. In illustrated example, three groups of battery cells 802a, 802b and 802c form a module 106. For example, any number of groups of battery cells 802 (e.g., one or more) can form a module 106, and any number of modules 106 can form a battery pack 104 of ESS 102.

At least one aspect of the technical solutions is directed to a system 100. The system 100 can be a system using or including one or more ESSs 102. System 100 can include one or more BMSs 110 utilizing battery monitor 112 to monitor SOC, SOH, temperature, charge capacity and other characteristics of battery nodes (e.g., battery cells 108, modules 106 or packs 104 of the ESS 102). System 100 can include one or more balance controllers 114 for using the characteristics monitored by the battery monitor 112 to determine the amount of energy to transfer from some of the battery nodes to other battery nodes. Balance controller 114 can generate control signals 262 and 264 for various active balancing circuits (ABCs) 200 that can be arranged in a single tier (e.g., 502) or a multi-tier (e.g., 504) arrangement, to transfer energy between various battery nodes, based on the determinations and the control signals of the balance controller 114. System 100 can include and combine any features or characteristics of systems or features discussed in connection with FIGS. 1-10.

The system 100 can include an ABC 200 coupled with a first battery cell 108 (e.g., a first battery cell 108 or 212) and a second battery cell 108 (e.g., a second battery cell 108 or 214). The ABC 200 can include a charge unit 220 to store energy transferred between the first battery cell (e.g., 212) and the second battery cell (e.g., 214). The ABC 200 can include a first node 226 of the charge unit 220 coupled with the first battery cell (e.g., 212) and with the second battery cell (e.g., 214) and a second node 228 of the charge unit 220 coupled with a first transistor 232. The ABC 200 can include a second transistor 234 coupled with the second node 228. At least one of the first transistor 232 and the second transistor 234 can control a first transfer of the energy from a first one of the first battery cell (e.g., 212) and the second battery cell (e.g., 214) to the charge unit 220 to store the energy. At least one of the first transistor (e.g., 212) and the second transistor can control a second transfer of the energy from the charge unit 220 to a remaining one of the first battery cell (e.g., 212) and the second battery cell (e.g., 214).

The charge unit 220 can include a resistor 222 disposed between the first node 226 and the second node 228 and an inductor 224 disposed between the first node 226 and the second node 228 to store the energy. The inductor 224 can be in parallel arrangement with the resistor 222. The first node 226 of the charge unit 220 can be coupled with a positive terminal of the first battery cell (e.g., 212) and a negative terminal of the second battery cell (e.g., 214). Each of the battery cells 108 (e.g., 212 or 214) can include a positive terminal for providing a first voltage output that is higher than a voltage output from a negative of the battery cell.

The ABC 200 can include a first capacitor 216 disposed between the first node 226 and a negative terminal of the first battery cell 212. The ABC 200 can include a second capacitor 218 disposed between the first node 226 and a positive terminal of the second battery cell 214. The ABC 200 can include a first control or input line 262 for the first transistor 232 to trigger, responsive to a signal from the balance controller 214 indicative of a first state (e.g., 602) of a cycle 310, the first transfer of the energy from the first battery cell 212 to the charge unit 220. The ABC 200 can include the first control or input line 262 for the first transistor 232 to trigger, responsive to a second signal from the balance controller 214 indicative of a second state (e.g., 604) of the cycle 310, the second transfer of the energy from the charge unit 220, via a diode 244 of the second transistor 234, to the second battery cell 214. The first signal can include a signal to turn the first transistor 232 on, such as during a first half (e.g., 602) of an energy transfer cycle 310. The second signal can include a signal to turn the first transistor 232 off, such as during a second half (e.g., 604) of the cycle 310.

The circuit can include a first input or control line 262 of the first transistor 232 to receive a signal indicative of a first state (e.g., 602) of a cycle 310 to operate the first transistor 232 according to the first phase of the signal. The first phase can correspond to a cycle of turning transistor 232 on and off based on the cycle 310 and as directed by the control input 262. The ABC 200 can include a second input or control line 262 of the second transistor 234 to receive the signal having a second phase that is offset from the first phase by 180 degrees. For example, a second control signal 264 for the transistor 234 can be offset by 180 degrees from the first control signal 262 for transistor 232. For example, when first transistor 232 is turned on, the second transistor 234 can be turned off, and vice versa.

The first transistor 232 can be a first metal-oxide semiconductor field effect transistor (MOSFET) comprising a first gate coupled with a first input or control line 262 to control the first transfer of the energy between the first battery cell 212 and the charge unit 220. The second transistor 234 can be a second MOSFET comprising a second gate coupled with a second input or control line 262 to control transfer of energy between the charge unit 220 and the second battery cell 214. The first node 226 can be coupled with the first battery cell 212 of a plurality of battery cells (e.g., 212 or 108) of a first battery module 106 of a plurality of battery modules 106. The first node 226 can be coupled with the second battery cell (e.g., 212 or 108) of a plurality of battery cells 108 of a second battery module 106 of the plurality of battery modules 106.

The system can include a second ABC 200 that can be coupled with the second battery cell 108 (e.g., 214) and a third battery cell 108. The second ABC 200 can include a second charge unit 220 to store energy transferred between the second battery cell (e.g., 214 or 108) and the third battery cell 108. The second ABC 200 can include a first node 226 of the second charge unit 220 coupled with the second battery cell (e.g., 214 or 108) and the third battery cell 108. The second ABC 200 can include a second node 228 of the second charge unit 220 coupled with a first transistor 232 of the second ABC 200. The second ABC 200 can include a second transistor 234 of the second ABC 200 coupled with the second node 228 of the second charge unit 220. The first transistor 232 of the second ABC 200 and the second transistor 234 of the second ABC 200 can control a first transfer of the energy from a first one of the second battery cell (e.g., 214 or 108) and the third battery cell 108 to the second charge unit 220 to store the energy. The first transistor 232 of the second ABC 200 and the second transistor 234 of the second ABC 200 can control a second transfer of the energy from the second charge unit 220 to a remaining one of the second battery cell (e.g., 214 or 108) and the third battery cell 108.

The system can include a third ABC 200 coupled with the first battery cell (e.g., 212 or 108) and another battery cell 108. The third ABC 200 can include a third charge unit 220 to store a third energy transferred between the first battery cell (e.g., 212 or 108) and the another battery cell 108. The third ABC 200 can include a first node 226 of the third charge unit 220 coupled with the third battery cell (e.g., 212 or 108) and a fourth battery cell 108. The third ABC 200 can include a second node 228 of the third charge unit 220 coupled with a first transistor 232 of the third ABC 200. The third ABC 200 can include a second transistor 234 of the third ABC 200 coupled with the second node 228 of the third charge unit 220. The first transistor 232 of the third ABC 200 and the second transistor 234 of the third ABC 200 can control a first transfer of the third energy from a first one of the first battery cell 108 and the another battery cell 108 to the third charge unit 220 to store the third energy. The first transistor 232 of the third ABC 200 and the second transistor 234 of the third ABC 200 can control a second transfer of the third energy from a remaining one of the first battery cell 108 and the another battery cell 108.

Figure 10:
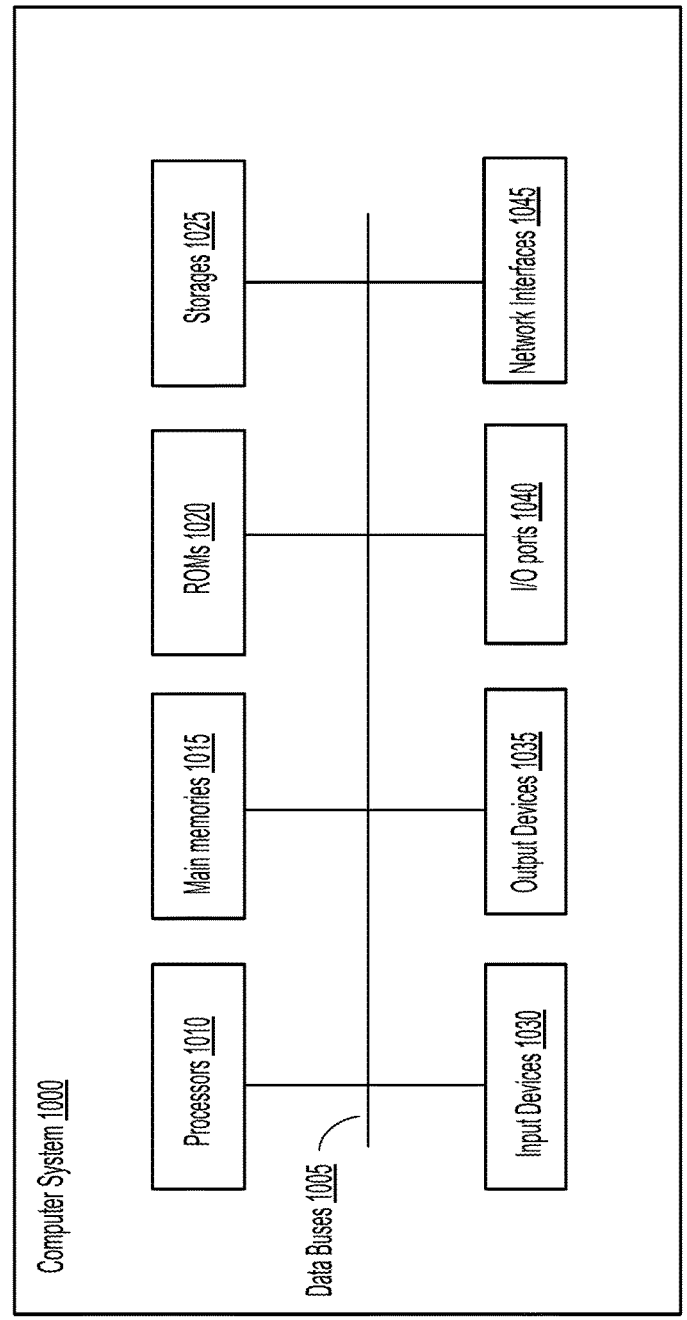
FIG. 10 illustrates a block diagram of an example computing system or a computer system.

FIG. 10 illustrates a block diagram of an example computing system or a computer system 1000. Computer system or a computing system 1000 can include various components for processing or computing digital data. Computer system 1000 can be used as a platform or a system on which any function, feature or implementation of example system 100 can be implemented, using for instance, instructions, commands, computer code or data stored and executed in one or more processors. For instance, computer system 1000 can be included in and execute any device or function, such as a battery management system 110, battery monitor 112 and balance controller 114. Computer system 1000 can be used for operating, implementing or running active energy balancing between battery nodes.

Computer system 1000 can include at least one bus data bus 1005 or other communication component or feature for communicating information and at least one processor 1010 or processing circuit coupled to the data bus 1005 for processing such information or data. Computer system 1000 can include one or more processors 1010 or processing circuits coupled to the data bus 1005 for exchanging or processing data or information. Computing system 1000 can include one or more main memories 1015, such as a random access memory (RAM), dynamic RAM (DRAM) or other dynamic storage device, which can be coupled to the data bus 1005 for storing information and instructions to be executed by the processor(s) 1010. Main memory 1015 can be used for storing information (e.g., data, computer code, commands or instructions) during execution of instructions by the processor(s) 1010.

Computing system 1000 can include one or more read only memories (ROMs) 1020 or other static storage device coupled to the bus 1005 for storing static information, data, code and instructions for the processor(s) 1010. Storage 1025 can include any storage device, such as a solid state device, magnetic disk or optical disk, which can be coupled to the data bus 1005 to persistently store information and instructions.

Computing system 1000 can be coupled via the data bus 1005 to one or more output devices 1035, such as speakers or displays, such as organic light emitting displays (OLEDs), liquid crystal displays or active matrix displays, that can be used for displaying or providing information to a user. Input devices 1030, such as keyboards, touch screens or voice interfaces, can be coupled to the data bus 1005 for communicating information and commands to the processor(s) 1010. Input device 1030 can include, for example, a touch screen display (e.g., output device 1035). Input device 1030 can include a cursor control, such as a mouse, a trackball, or cursor direction keys, for communicating direction information and command selections to the processor(s) 1010 for controlling cursor movement on a display.

Computer system 1000 can include input/output ports 1040, also referred to as I/O ports 1040, that can include physical interfaces that facilitate or provide communication between external or peripheral devices and processor(s) 1010 and/or memory 1015. I/O ports 1040 can be connected to data bus 1005, allowing the transfer of data between the processor(s) 1010, memories 1015, and any external devices (e.g., keyboards, mice, printers, and external storage devices). Computer system 1000 can also include one or more network interfaces 1045 coupled via data buses 1005 to facilitate network communication. Network interfaces 1045 can include any physical or virtual components enabling communication between the computer system 1000 and any external networks (e.g., the Internet). Network interface 1045 can provide transfer of data between the processor(s) 1010, memories 1015 and any external networks.

The technical solutions, such as systems and methods described herein, can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors 1010 in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including in virtual machines or environments, on the cloud-based systems or structures disclosed in this specification and their structural equivalents, or in combinations of one or more of them.

Figure 11:
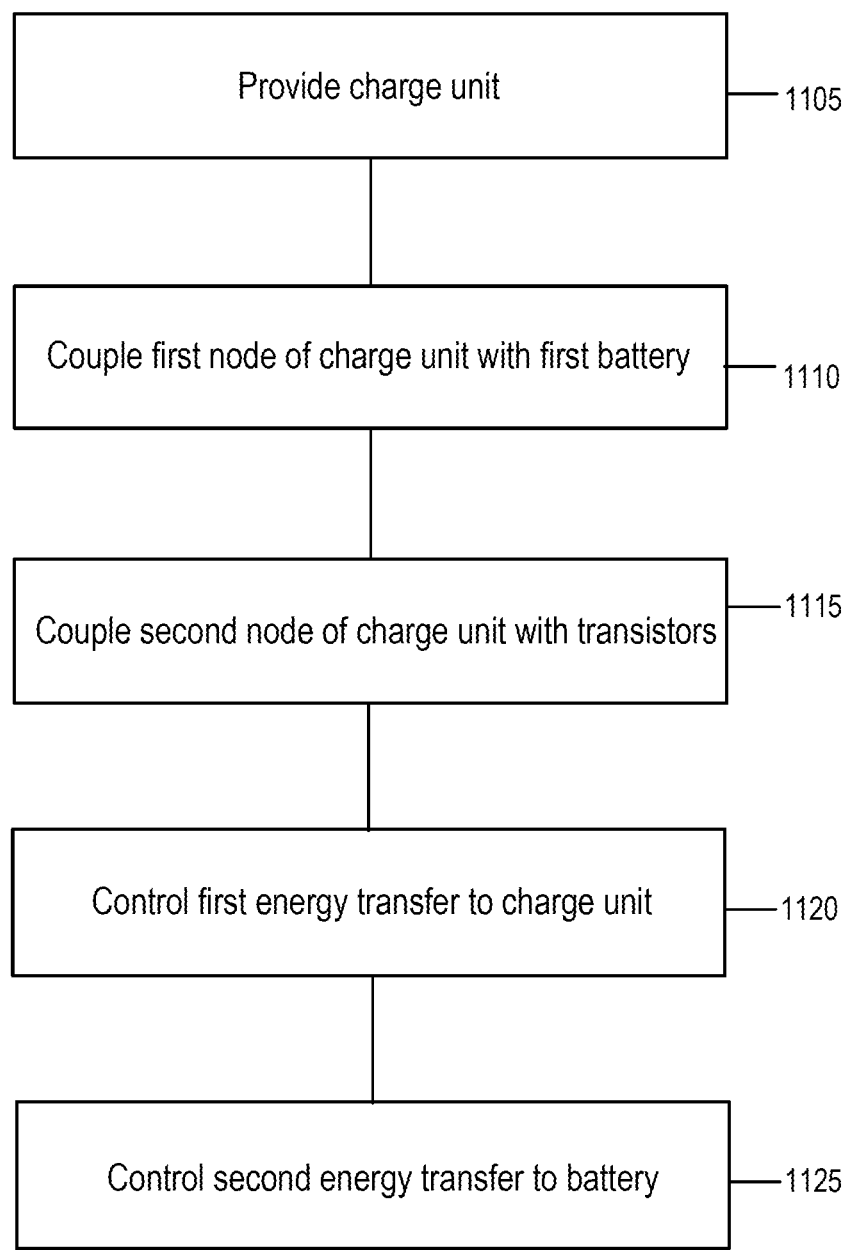
FIG. 11 illustrates a method for providing active energy balancing between battery nodes of an ESS using one or more active balancing circuits.

FIG. 11 illustrates a method 1100 for providing active energy balancing between battery nodes (e.g., battery cells, modules and packs) of an energy storage system using one or more active balancing circuits. The method 1100 can be performed by one or more systems or components depicted in FIGS. 1-10, including, for example, an ESS 102 and a BMS 110 for controlling active balance circuits (ABCs) for transferring energy to implement energy balance determined by the balance controller 114 of the BMS 110 between different battery nodes. In brief overview, the method 1100 can include ACTS 1105-1125. At ACT 1105, the method can provide charge unit. At ACT 1110, the method can couple first node of charge unit with first battery. At ACT 1115, the method can couple second node of charge unit with transistors. At ACT 1120, the method can control first energy transfer to charge unit. At ACT 1125, the method can control second energy transfer to the battery.

At ACT 1105, the method can provide charge unit. The method can include a circuit coupled with a first battery cell and a second battery cell providing a charge unit for storing energy transferred between the first battery cell and the second battery cell. The circuit can include an active balancing circuit (ABC). The ABC can include a charge unit for receiving, storing and releasing energy according to one or more transistors that can be controlled by balance controller of a battery management system (BMS). For instance, a transistor configured to control access of energy to the charge unit can trigger charging of the charge unit with energy from a first battery cell in response to a first signal from a balance controller (e.g., turning the transistor on) and discharging the energy from the charge unit in response to a second signal from the balance controller (e.g., turning the transistor off).

The ABC can include the charge unit that includes an inductor. The method can include disposing a resistor between the first node and the second node of the ABC. The method can include disposing an inductor between the first node and the second node of the ABC. The method can include arranging in the resistor and the inductor in a parallel arrangement to store the energy using the inductor. For instance, the charge unit of the active balancing circuit can include an inductor and a resistor arranged or connected in parallel with each other and coupling with each other at the first node and the second node. The charge unit can include any arrangement of reactance components, including one or more inductors or capacitors arranged in any combination of parallel and series arrangements with any number of resistors to store energy or charge during the course of energy transfer between battery nodes.

The method can include a second circuit (e.g., second ABC) coupled with the second battery cell and a third battery cell providing a second charge unit to store the energy transferred between the second battery cell and the third battery cell. The second charge unit can include a second inductor and a second resistor coupled with the second inductor in a parallel arrangement. The method can include providing, by a third circuit coupled with the first battery cell and another battery cell, a third charge unit to store a third energy transferred between the first battery cell and the another battery cell. The another battery cell can include a fourth battery cell with which neither the first nor second ABC is coupled.

At ACT 1110, the method can couple first node of charge unit with first battery. The method can include the active balancing circuit coupling a first node of the charge unit with the first battery cell and with the second battery cell. The method can include coupling the first node with a positive terminal of the first battery cell and coupling the first node with a negative terminal of the second battery cell. The method can include disposing a first capacitor between the first node and a negative terminal of the first battery cell and disposing a second capacitor between the first node and a positive terminal of the second battery cell.

The method can include coupling the first node with the first battery cell of a first plurality of battery cells of a first battery module of a plurality of battery modules. The method can include coupling the first node with the second battery cell of a second plurality of battery cells of a second battery module of the plurality of battery modules. The method can include coupling, by the second circuit, a first node of the second charge unit with the second battery cell and with the third battery cell. The method can include coupling, by the third circuit, a first node of the third charge unit with the third battery cell and with a fourth battery cell.

At ACT 1115, the method can couple second node of charge unit with transistors. The method can include the circuit (e.g., ABC) coupling a second node of the charge unit with a first transistor and with the second transistor. The method can include coupling a first gate of a first metal-oxide semiconductor field effect transistor (MOSFET) of the first transistor with a first input line to control the first transfer of the energy between the first battery cell and the charge unit. The method can include coupling a second gate of a second MOSFET of the second transistor with a second input line to control transfer of energy between the charge unit and the second battery cell.

The method can include the second circuit coupling a second node of the charge unit with a first transistor of the second circuit and with the second transistor of the second circuit. For instance, a second ABC can couple a transistor of the second ABC with the charge unit of the first ABC. The method can include the third circuit coupling a second node of the third charge unit with a first transistor of the third circuit and with a second transistor of the third circuit.

At ACT 1120, the method can control first energy transfer to charge unit. The method can include the circuit (e.g., ABC) controlling a first transfer of the energy from a first one of the first battery cell and the second battery cell to the charge unit to store the energy. The method can include triggering, using a first input or control line for the first transistor and responsive to a signal indicative of a first state of a cycle, the first transfer of the energy from the first battery cell to the charge unit.

The method can include operating the first transistor according to a first phase of a signal indicative of a first state of a cycle at a first input line for the first transistor. For instance, a balance controller can issue an instruction to trigger, via a control input into one of a first or a second transistor, a signal to activate or turn on the first or the second transistor to charge the charge unit from a battery cell determined by the balance controller to have a surplus of energy. The method can include operating the second transistor according to a second phase of the signal at a second input line for the second transistor, wherein the second phase is offset from the first phase by 180 degrees. For instance, a first tier ABC can operate transistors providing energy or receiving energy to a battery cell at a phase that is 180 degrees offset from a phase of a transistor of a second tier ABC operating transistors to provide energy or receive energy to the same battery cell. For instance, a first tier ABC can operate transistors providing energy or receiving energy to a battery cell at a phase that is 180 degrees offset from a phase of a transistor of a second tier ABC operating transistors to provide energy or receive energy to, or from, a different battery cell.

The method can include controlling, by the second circuit, a first transfer of the energy from a first one of the second battery cell and the third battery cell to the second charge unit. For instance, an ABC can transfer energy between any two battery cells, via charge unit, and based on control inputs to the first or the second transistor. The method can include controlling, by the third circuit, a first transfer of the third energy from a first one of the first battery cell and the another battery cell to a third charge unit to store the energy.

At ACT 1125, the method can control second energy transfer to the battery. The method can include the circuit (e.g., ABC) controlling a second transfer of the energy from the charge unit to a remaining one of the first battery cell and the second battery cell. For instance, the balance controller can issue a command to generate a control input to turn off one of the first or the second transistors to cause the release of the energy stored in the charge unit, via a diode of a remaining one of the first or the second transistor, and towards the recipient battery cell.

The method can include triggering, using the first input line for the first transistor and responsive to a second signal indicative of a second state of the cycle, the second transfer of the energy from the charge unit, via a diode of the second transistor, to the second battery cell. The method can include the second circuit (e.g., second ABC) controlling a second transfer of the energy from the second charge unit to a remaining one of the second battery cell and the third battery cell. The method can include the third circuit (e.g., the third ABC) controlling, a second transfer of the third energy from a remaining one of the first battery cell and the another battery cell to a remaining one of the first battery cell and the another battery cell.

As displayed above, the BMS described herein is operational, and includes numerous technological improvements in comparison to other BMSs. With the ability to manage both varying cell quantities and cell types, the developed BMS described herein provides technical advantages.

The processes, systems and methods described herein can be implemented by the computing system in response to the processor executing an arrangement of instructions contained in main memory. Such instructions can be read into main memory from another computer-readable medium, such as the storage device. Execution of the arrangement of instructions contained in main memory causes the computing system to perform the illustrative processes described herein. One or more processors in a multi-processing arrangement may also be employed to execute the instructions contained in main memory. Hard-wired circuitry can be used in place of or in combination with software instructions together with the systems and methods described herein. Systems and methods described herein are not limited to any specific combination of hardware circuitry and software.

The subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described herein can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. The computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (e.g., a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit).

Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a first circuit coupled with a first battery cell and a second battery cell, the first circuit comprising:
        a first charge unit to store energy transferred between the first battery cell and the second battery cell, the first charge unit comprising a resistor in parallel arrangement with an inductor, the resistor coupled with a first node of the first charge unit and a second node of the first charge unit and the inductor coupled with the first node of the first charge unit and the second node of the first charge unit;
        the first node of the first charge unit coupled with the first battery cell and with the second battery cell and the second node of the first charge unit coupled with a first transistor of the first circuit; and
        a second transistor of the first circuit coupled with the second node of the first charge unit, wherein at least one of the first transistor of the first circuit and the second transistor of the first circuit are to:
        control a first transfer of the energy from a first one of the first battery cell or the second battery cell to the first charge unit to store the energy via the inductor and the resistor; and
        control a second transfer of the energy from the first charge unit via the inductor and the resistor to a remaining one of the first battery cell and the second battery cell;
    a second circuit coupled with the second battery cell and a third battery cell, the second circuit comprising a second charge unit to store energy transferred between the second battery cell and the third battery cell, the second charge unit comprising a first node of the second charge unit coupled with the second battery cell and the third battery cell and a second node of the second charge unit coupled with a first transistor of the second circuit and a second transistor of the second circuit to control energy transfer between the second battery cell and the third battery cell via the second charge unit; and
    a third circuit coupled with the second battery cell and a fourth battery cell that is not directly coupled with the first circuit or the second circuit, the third circuit comprising:
        a third charge unit:
        a first node of the third charge unit coupled with the second battery cell and a second node of the third charge unit coupled with a first transistor of the third circuit and a second transistor of the third circuit that is coupled with the fourth battery cell, at least one of the first transistor of the third circuit or the second transistor of the third circuit to:
            control a third transfer of the energy from the remaining one of the first battery cell or the second battery cell to the third charge unit of the third circuit to store the energy in the third charge unit; and
            control a fourth transfer of the energy from the third charge unit to the fourth battery cell; and
        a controller configured to cause the first transfer and the second transfer to be completed within a first cycle and the third transfer and the fourth transfer to be completed within a second cycle.

2. The system of claim 1, comprising:
    a second resistor coupled with the first battery cell and with a circuit comprising a transistor configured to selectively dissipate, via the second resistor, a portion of energy stored at the first battery cell in response to the first battery cell achieving full charge before the second battery cell achieves the full charge.

3. The system of claim 1, wherein the first node of the first charge unit is coupled with a positive terminal of the first battery cell and a negative terminal of the second battery cell, and wherein the first node of the second charge unit and the first node of the third charge unit are each coupled with a positive terminal of the second battery cell and a negative terminal of the third battery cell.

4. The system of claim 1, wherein the first transistor of the third circuit is coupled with a fifth battery cell that is not directly coupled with the first circuit or the second circuit.

5. The system of claim 1, wherein:
    the first transistor of the first circuit is a first metal-oxide semiconductor field effect transistor (MOSFET) comprising a first gate coupled with a first input line to control the first transfer of the energy between the first battery cell and the first charge unit; and
    the second transistor of the first circuit is a second MOSFET comprising a second gate coupled with a second input line to control the second transfer of energy between the first charge unit and the second battery cell.

6. The system of claim 1, wherein the first node of the first charge unit is coupled with the first battery cell of a plurality of battery cells of a first battery module of a plurality of battery modules, and wherein the first node of the first charge unit is coupled with the second battery cell of a plurality of battery cells of a second battery module of the plurality of battery modules.

7. The system of claim 1,
    wherein at least one of the first transistor of the second circuit and the second transistor of the second circuit are to:

control a first transfer of the energy from a first one of the second battery cell or the third battery cell to the second charge unit to store the energy; and control a second transfer of the energy from the second charge unit to a remaining one of the second battery cell or the third battery cell.

8. The system of claim 1, comprising:

a battery monitor to monitor operational parameters of the first battery cell, the second battery cell, the third battery cell and the fourth battery cell; and wherein the controller implements the first transfer, the second transfer, the third transfer A and the fourth transfer responsive to the operational parameters.

9. The system of claim 1, comprising:

a first input line for the first transistor of the first circuit to trigger, responsive to a signal indicative of a first state of the first cycle, the first transfer of the energy from the first battery cell to the first charge unit; and the first input line for the first transistor to trigger, responsive to a second signal indicative of a second state of the first cycle, the second transfer of the energy from the first charge unit, via a diode of the second transistor of the first circuit, to the second battery cell.

10. The system of claim 9, comprising:

a first input line for the first transistor of the third circuit to trigger, responsive to a third signal indicative of a first state of the second cycle, the third transfer of the energy from the second battery cell to the third charge unit; and the first input line for the third transistor to trigger, responsive to a fourth signal indicative of a second state of the second cycle, the second transfer of the energy from the third charge unit, via a diode of the second transistor of the third circuit, to the fourth battery cell.

11. A method, comprising:

coupling a first circuit with a first battery cell and a second battery cell, the first circuit comprising a first charge unit for storing energy transferred between the first battery cell and the second battery cell, the first charge unit comprising a resistor in parallel arrangement with an inductor, the resistor coupled with a first node of the first charge unit and a second node of the first charge unit and the inductor coupled with the first node of the first charge unit and the second node of the first charge unit;

coupling, by the first circuit, the first node of the first charge unit with the first battery cell and with the second battery cell;

coupling, by the first circuit the second node of the first charge unit with a first transistor of the first circuit and with a second transistor of the first circuit;

controlling, by the first circuit, a first transfer of the energy from a first one of the first battery cell and the second battery cell to the first charge unit to store the energy via the inductor and the resistor; and controlling, by the first circuit, a second transfer of the energy from the first charge unit via the inductor and the resistor to a remaining one of the first battery cell and the second battery cell;

coupling a second circuit with the second battery cell and a third battery cell, the second circuit comprising a second charge unit to store energy transferred between the second battery cell and the third battery cell, the second charge unit comprising a first node of the second charge unit coupled with the second battery cell and the third battery cell and a second node of the second charge unit coupled with a first transistor of the second circuit and a second transistor of the second circuit to control energy transfer between the second battery cell and the third battery cell via the second charge unit:

coupling a third circuit with the second battery cell and a fourth battery cell that is not directly coupled with the first circuit or the second circuit:

coupling, a first node of a third charge unit of the third circuit with the second battery cell;

coupling a second node of the third charge unit with a first transistor of the third circuit and a second transistor of the third circuit that is coupled with the fourth battery cell:

controlling, by at least one of the first transistor of the third circuit or the second transistor of the third circuit, a third transfer of the energy from the remaining one of the first battery cell or the second battery cell to the third charge unit of the third circuit to store the energy in the third charge unit;

controlling, by the at least one of the first transistor of the third circuit or the second transistor of the third circuit, a fourth transfer of the energy from the third charge unit to the fourth battery cell; and causing, by a controller, the first transfer and the second transfer to be completed within a first cycle and the third transfer and the fourth transfer to be completed within a second cycle.

12. The method of claim 11, comprising:

coupling, by a second resistor, the first battery cell and circuit comprising a transistor configured to selectively dissipate, via the second resistor, a portion of energy stored at the first battery cell in response to the first battery cell achieving full charge before the second battery cell achieves the full charge.

13. The method of claim 11, comprising:

coupling the first transistor of the third circuit with a fifth battery cell that is not directly coupled with the first circuit or the second circuit.

14. The method of claim 11, comprising:

triggering, using a first input line for the first transistor of the first circuit and responsive to a signal indicative of a first state of the first cycle, the first transfer of the energy from the first battery cell to the first charge unit; and triggering, using the first input line for the first transistor of the first circuit and responsive to a second signal indicative of a second state of the second cycle, the second transfer of the energy from the charge unit, via a diode of the second transistor of the first circuit, to the second battery cell.

15. The method of claim 11, comprising:

triggering, via a first input line for the first transistor of the third circuit, responsive to a third signal indicative of a first state of the second cycle, the third transfer of the energy from the second battery cell to the third charge unit; and triggering, via the first input line for the third transistor, responsive to a fourth signal indicative of a second state of the second cycle, the second transfer of the energy from the third charge unit, via a diode of the second transistor of the third circuit, to the fourth battery cell.

16. The method of claim 11, comprising:

coupling a first gate of a first metal-oxide semiconductor field effect transistor (MOSFET) of the first transistor of the first circuit with a first input line to control the first transfer of the energy between the first battery cell and the first charge unit; and coupling a second gate of a second MOSFET of the second transistor of the first circuit with a second input line to control transfer of energy between the first charge unit and the second battery cell.

17. The method of claim 11, comprising:
coupling the first node of the first charge unit with the first battery cell of a first plurality of battery cells of a first battery module of a plurality of battery modules; and
coupling the first node of the first charge unit with the second battery cell of a second plurality of battery cells of a second battery module of the plurality of battery modules.

18. The method of claim 11, comprising:
controlling, by at least one of the first transistor of the second circuit and the second transistor of the second circuit, a first transfer of the energy from a first one of the second battery cell and the third battery cell to the second charge unit; and
controlling, by the at least one of the first transistor of the second circuit and the second transistor of the second circuit, a second transfer of the energy from the second charge unit to a remaining one of the second battery cell and the third battery cell.

19. The method of claim 11, comprising:
monitoring, by a battery monitor, operational parameters of the first battery cell, the second battery cell, the third battery cell and the fourth battery cell; and
implementing, by the controller, the first transfer, the second transfer, the third transfer and the fourth transfer responsive to the operational parameters.

20. An energy storage system, comprising:
a first circuit for energy transfer between a first battery cell and a second battery cell of the energy storage system, the first circuit comprising:
    a first charge unit of the first circuit to store energy transferred between the first battery cell and the second battery cell, the first charge unit comprising:
        a resistor coupled with a first node of the first charge unit and a second node of the first charge unit; and
        an inductor coupled with the first node of the first charge unit and the second node of the first charge unit and arranged in parallel with the resistor;
    the first node of the first charge unit coupled with a positive terminal of the first battery cell and with a negative terminal of the second battery cell;
    a first transistor of the first charge unit coupled with the second node of the first charge unit; and
    a second transistor of the first circuit coupled with the second node of the first charge unit, wherein at least one of the first transistor of the first charge unit and the second transistor of the first circuit are to control transfer of the energy between the first battery cell and the second battery cell, via the inductor and the resistor;
a second charge unit to store energy transferred between the second battery cell and a third battery cell, the second charge unit comprising a first node of the second charge unit coupled with the second battery cell and the third battery cell and a second node of the second charge unit coupled with a first transistor of the second circuit and a second transistor of the second circuit to control energy transfer between the second battery cell and the third battery cell via the second charge unit; and
a third circuit coupled with the second battery cell and a fourth battery cell that is not directly coupled with the first circuit or the second circuit;
a third charge unit of the third circuit;
a first node of the third charge unit coupled with the second battery cell and a second node of the third charge unit coupled with a first transistor of the third circuit and a second transistor of the third circuit that is coupled with the fourth battery cell, at least one of the first transistor of the third circuit or the second transistor of the third circuit to:
    control a third transfer of the energy from the remaining one of the first battery cell or the second battery cell to the third charge unit of the third circuit to store the energy in the third charge unit; and
    control a fourth transfer of the energy from the third charge unit to the fourth battery cell; and
a controller configured to cause the first transfer and the second transfer to be completed within a first cycle and the third transfer and the fourth transfer to be completed within a second cycle.

* * * * *